United States Patent
Kariyama et al.

(10) Patent No.: US 9,726,216 B2
(45) Date of Patent: Aug. 8, 2017

(54) CABLE ADJUSTING UNIT

(71) Applicant: Shimano Inc., Sakai, Osaka (JP)

(72) Inventors: Osamu Kariyama, Osaka (JP);
Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 69 days.

(21) Appl. No.: 13/758,087

(22) Filed: Feb. 4, 2013

(65) Prior Publication Data
US 2014/0216198 A1    Aug. 7, 2014

(51) Int. Cl.
| | | |
|---|---|---|
| *F16C 1/22* | (2006.01) | |
| *B62L 3/02* | (2006.01) | |
| *B60T 11/04* | (2006.01) | |
| *B62M 25/08* | (2006.01) | |
| *B60T 7/10* | (2006.01) | |
| *F16D 65/38* | (2006.01) | |
| *F16D 125/60* | (2012.01) | |
| *F16D 129/10* | (2012.01) | |

(52) U.S. Cl.
CPC ............ *F16C 1/226* (2013.01); *B60T 7/102* (2013.01); *B60T 11/046* (2013.01); *B62L 3/02* (2013.01); *B62M 25/08* (2013.01); *F16C 2326/20* (2013.01); *F16C 2326/28* (2013.01); *F16D 2065/386* (2013.01); *F16D 2125/60* (2013.01); *F16D 2129/10* (2013.01); *Y10T 74/20462* (2015.01)

(58) Field of Classification Search
CPC ......... F16C 1/226; B60T 7/102; B60T 11/046
USPC .................. 74/500.5, 502.4, 502.6
See application file for complete search history.

(56) References Cited

U.S. PATENT DOCUMENTS

| | | | |
|---|---|---|---|
| 2,879,089 A * | 3/1959 | Kobylinski | 403/230 |
| 3,678,964 A * | 7/1972 | Andrews | 138/103 |
| 4,570,506 A * | 2/1986 | Yamamoto et al. | 74/501.5 R |
| 4,766,985 A * | 8/1988 | Brusasco | 192/84.6 |
| 4,865,165 A * | 9/1989 | Taig | 188/156 |
| 5,117,958 A | 6/1992 | Focqueur et al. | |
| 5,350,194 A * | 9/1994 | Fohl | 280/805 |
| 5,545,982 A | 8/1996 | Vlakancic | |
| 5,590,744 A * | 1/1997 | Belmond | 188/265 |
| 5,630,338 A | 5/1997 | Patterson et al. | |
| 6,244,394 B1 * | 6/2001 | Gutierrez et al. | 188/72.8 |
| 6,863,162 B1 * | 3/2005 | Gabas | 188/2 D |
| 8,051,956 B2 * | 11/2011 | Huang et al. | 188/2 D |
| 2006/0231352 A1 * | 10/2006 | Funk et al. | 188/72.8 |
| 2009/0044799 A1 * | 2/2009 | Qiu | A61B 5/0084 |
| | | | 128/200.26 |

(Continued)

FOREIGN PATENT DOCUMENTS

| | | |
|---|---|---|
| DE | 3116118 A1 | 12/1982 |
| DE | 69303389 T2 | 10/1996 |
| DE | 19828305 A1 | 3/1999 |

(Continued)

*Primary Examiner* — Vicky Johnson
(74) *Attorney, Agent, or Firm* — Global IP Counselors, LLP

(57) ABSTRACT

A cable adjusting unit includes a first member, a second member and an actuator. The second member is movably arranged with respect to the first member. The actuator is operatively coupled to at least one of the first member and the second member. The actuator is arranged to relatively move the first member with respect to the second member.

18 Claims, 12 Drawing Sheets

(56) References Cited

U.S. PATENT DOCUMENTS

2013/0091975 A1    4/2013  Kariyama et al.

FOREIGN PATENT DOCUMENTS

| DE | 60207030 T2     | 4/2006  |
| DE | 102006036283 B4 | 6/2008  |
| JP | 3-17320 U       | 2/1991  |
| TW | 329217 U        | 4/1998  |
| TW | 420107 U        | 1/2001  |
| TW | M363436 U       | 8/2009  |
| TW | 201119905 A     | 12/2009 |
| WO | 98/56633 A1     | 12/1998 |

* cited by examiner

CABLE ADJUSTING UNIT

BACKGROUND

Field of the Invention

This invention generally relates to a cable adjusting unit. More specifically, the present invention relates to a cable adjusting unit for adjusting a bicycle cable.

Background Information

Bicycles often have components that are manually operated by a bicycle control cable (e.g., a brake cable and a gear shift cable). In particular, the bicycle control cable interconnects a "manually operated part" of the bicycle to a "cable operated part" of the bicycle. Examples of "manually operated parts" include brake levers and gear shifters. Examples of "cable operated parts" include brake devices and gear changing devices. Typically, conventional bicycle control cables have, for example, a tubular outer case and an inner wire that can be inserted into and passed through the outer case. The inner wire protrudes beyond both ends of the outer case and each end of the inner wire is connected to either a manually operated part or a cable-operated part. This type of bicycle control cable is often called a Bowden type of bicycle control cable.

Conventionally, for adjusting a tension of the inner wire, a cable adjuster is provided to the bicycle control cable.

SUMMARY

It has been discovered that since the conventional cable adjuster is manually operated, an install position of the cable adjuster on the bicycle is limited.

One aspect is to provide a cable adjusting unit which can be installed at various locations on a bicycle.

In accordance with a first aspect, a cable adjusting unit includes a first member, a second member and an actuator. The second member is movably arranged with respect to the first member. The actuator is operatively coupled to at least one of the first member and the second member. The actuator is arranged to relatively move the first member with respect to the second member.

In accordance with a second aspect, with the cable adjusting unit according to the first aspect, the first member further includes a first abutment that is configured to face an outer case of a bicycle cable when the bicycle cable is attached to the cable adjusting unit.

In accordance with a third aspect, with the cable adjusting unit according to the second aspect, the second member further includes a second abutment, the first and second abutment facing away from each other.

In accordance with a fourth aspect, with the cable adjusting unit according to the first aspect, the first member further includes a first through hole through which an inner cable of a bicycle cable is configured to be disposed when the bicycle cable is attached to the cable adjusting unit.

In accordance with a fifth aspect, with the cable adjusting unit according to the fourth aspect, the second member further includes a second through hole through which the inner cable of the bicycle cable is configured to be disposed when the bicycle cable is attached to the cable adjusting unit.

In accordance with a sixth aspect, with the cable adjusting unit according to the first aspect, the actuator includes a motor.

In accordance with a seventh aspect, with the cable adjusting unit according to the first aspect, the actuator includes a solenoid.

In accordance with an eighth aspect, with the cable adjusting unit according to the first aspect, the first and second members are rotatably coupled with respect to each other.

In accordance with a ninth aspect, with the cable adjusting unit according to the eighth aspect, the first and second members are coupled together with a thread coupling.

In accordance with a tenth aspect, the cable adjusting unit according to the eighth aspect further includes a drive train operatively coupled between a drive shaft of the actuator and the first member. The drive train is configured to relatively rotate the first member with respect to the second member in response to a rotational movement of the drive shaft of the actuator.

In accordance with an eleventh aspect, with the cable adjusting unit according to the first aspect, the first and second members are non-rotatably coupled with respect to each other.

In accordance with a twelfth aspect, the cable adjusting unit according to the eleventh aspect further includes a drive train operatively coupled between a drive shaft of the actuator and the first member. The drive train is configured to relatively slide the first member with respect to the second member in response to a rotational movement of the drive shaft of the actuator.

In accordance with a thirteenth aspect, the cable adjusting unit according to the first aspect further includes a drive train operatively coupled between a drive shaft of the actuator and the first member. The drive train is configured to relatively slide the first member with respect to the second member in response to an axial movement of the drive shaft of the actuator.

In accordance with a fourteenth aspect, the cable adjusting unit according to the first aspect further includes a controller operatively coupled to the actuator. The controller is configured to operate the actuator upon receiving an input signal.

In accordance with a fifteenth aspect, with the cable adjusting unit according to the fourteenth aspect, the controller is configured to receive the input signal from a manually operated device that is electrically coupled to the controller.

In accordance with a sixteenth aspect, with the cable adjusting unit according to the fourteenth aspect, the controller is configured to receive the input signal from a brake sensor that is electrically coupled to the controller and configured to detect a state of a bicycle brake.

In accordance with a seventeenth aspect, with the cable adjusting unit according to the fourteenth aspect, the controller is configured to receive the input signal from a noise sensor that is electrically coupled to the controller and configured to detect a noise of a bicycle component.

In accordance with an eighteenth aspect, with the cable adjusting unit according to the seventeenth aspect, the noise sensor includes an accelerometer.

In accordance with a nineteenth aspect, with the cable adjusting unit according to the fourteenth aspect, the controller is configured to receive the input signal from a cable stroke sensor that is electrically coupled to the controller and configured to detect a cable stroke of a bicycle cable.

In accordance with a twentieth aspect, with the cable adjusting unit according to the first aspect, the first member is configured to be disposed with respect to a bicycle cable such that an end of a first outer case of the bicycle cable contacts with a first abutment of the first member, and such that an inner cable of the bicycle cable is disposed through a first through hole of the first member.

In accordance with a twenty-first aspect, with the cable adjusting unit according to the twentieth aspect, the second member is a part of one of a brake operating device, a shift operating device, a derailleur and a transmission device.

In accordance with a twenty-second aspect, with the cable adjusting unit according to the first aspect, the first member and the second member are configured to be disposed between adjacent ends of first and second outer cases of a bicycle cable such that the adjacent ends of the first and second outer cases of the bicycle cable contact with first and second abutments of the first and second members, respectively, and such that an inner cable of the bicycle cable is disposed through first and second through holes of the first and second members.

In accordance with a twenty-third aspect, with the cable adjusting unit according to the first aspect, the actuator is operatively coupled to both of the first member and the second member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
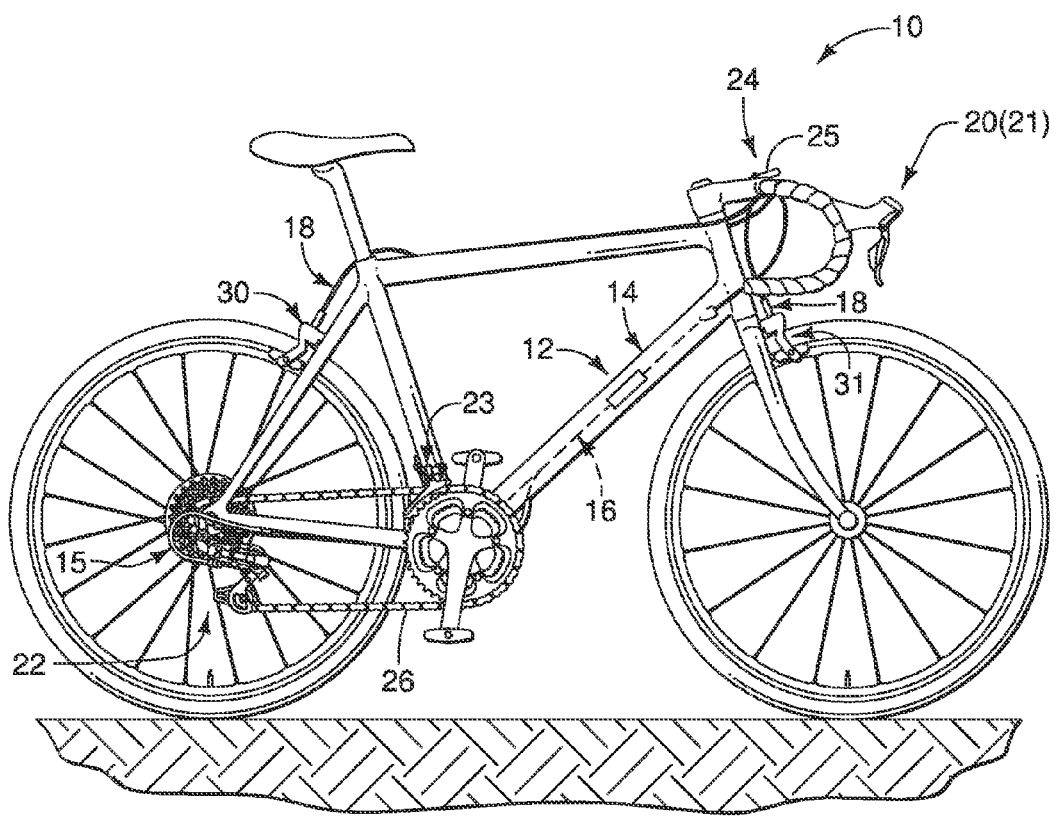
FIG. 1 is a side elevational view of a bicycle that is equipped with a cable adjusting unit in accordance with a first embodiment.

Referring initially to FIG. 1, a bicycle 10 is illustrated that is equipped with a cable adjusting unit 12 in accordance with a first embodiment. While the bicycle 10 is illustrated as a racing style road bike, the cable adjusting unit 12 is not limited to use with a road bike. The cable adjusting unit 12 is provided for adjusting a tension of one of bicycle control cables 15, 16, 17 and 18 (e.g., bicycle cables), as explained below. In the illustrated embodiment, the cable adjusting unit 12 is provided in the area of a down tube of a bicycle frame 14 of the bicycle 10 for adjusting a tension of the bicycle control cables 16, as explained below. However, the cable adjusting unit 12 can also provided at any place on the bicycle 10 along the bicycle control cables 15, 16, 17 and 18 for adjusting the bicycle control cables 15, 16, 17 and 18, respectively.

Referring to FIG. 1, the bicycle 10 basically includes a first shift operating device or shifter 20, a second shift operating device or shifter 21, a rear derailleur 22, a front derailleur 23, a cycling computer 24 with a cable controller 25 (e.g., a controller), a rear brake 30, and a front brake 31. In the illustrated embodiment, the cable controller 25 is provided with the cycling computer 24 for the rider or other users to control the cable adjusting unit 12. Alternatively, the cable controller 25 can be provided separately from the cycling computer 24. Specifically, the cable controller 25 can be provided with one of the first and second shifters 20 and 21.

Basically, in order to shift gears, the first and second shifters 20 and 21 are manually operated by the rider to operate the rear and front derailleurs 22 and 23 to move a bicycle chain 26 laterally with respect to the bicycle frame 14. As illustrated in FIG. 1, the first and second shifters 20 and 21 are brake and shift operating devices in which the first shifter 20 is fixedly mounted on the right-hand side of a handlebar of the bicycle and the second shifter 21 is fixedly mounted on the left-hand side of the handlebar. In particular, the first shifter 20 is operatively connected to the rear derailleur 22 and the rear brake 30, while the second shifter 21 is operatively connected to the front derailleur 23 and the front brake 31. Of course, alternatively, the front derailleur 23 and the front brake 31 can be connected to the first shifter 20, and the rear derailleur 22 and the rear brake 30 can be connected to the second shifter 21.

In the illustrated embodiment, the first and second shifters 20 and 21 are mechanically connected to the rear and front derailleurs 22 and 23 and the rear and front brakes 30 and 31, respectively, using conventional Bowden-type bicycle control cables 15, 16, 17 and 18. In particular, the first and second shifters 20 and 21 are mechanically connected to the rear and front derailleurs 22 and 23 via the bicycle control cables 15 and 16, respectively. Furthermore, the first and second shifters 20 and 21 are also mechanically connected to the rear and front brakes 30 and 31 via the bicycle control cables 17 and 18, respectively. In the illustrated embodiment, since the first and second shifters 20 and 21 are conventional, the detailed configurations will be omitted for the sake of brevity. Furthermore, since the rear and front derailleurs 22 and 23, and the rear and front brakes 30 and 31 are conventional, the detailed configurations will be omitted for the sake of brevity.

Figure 2:
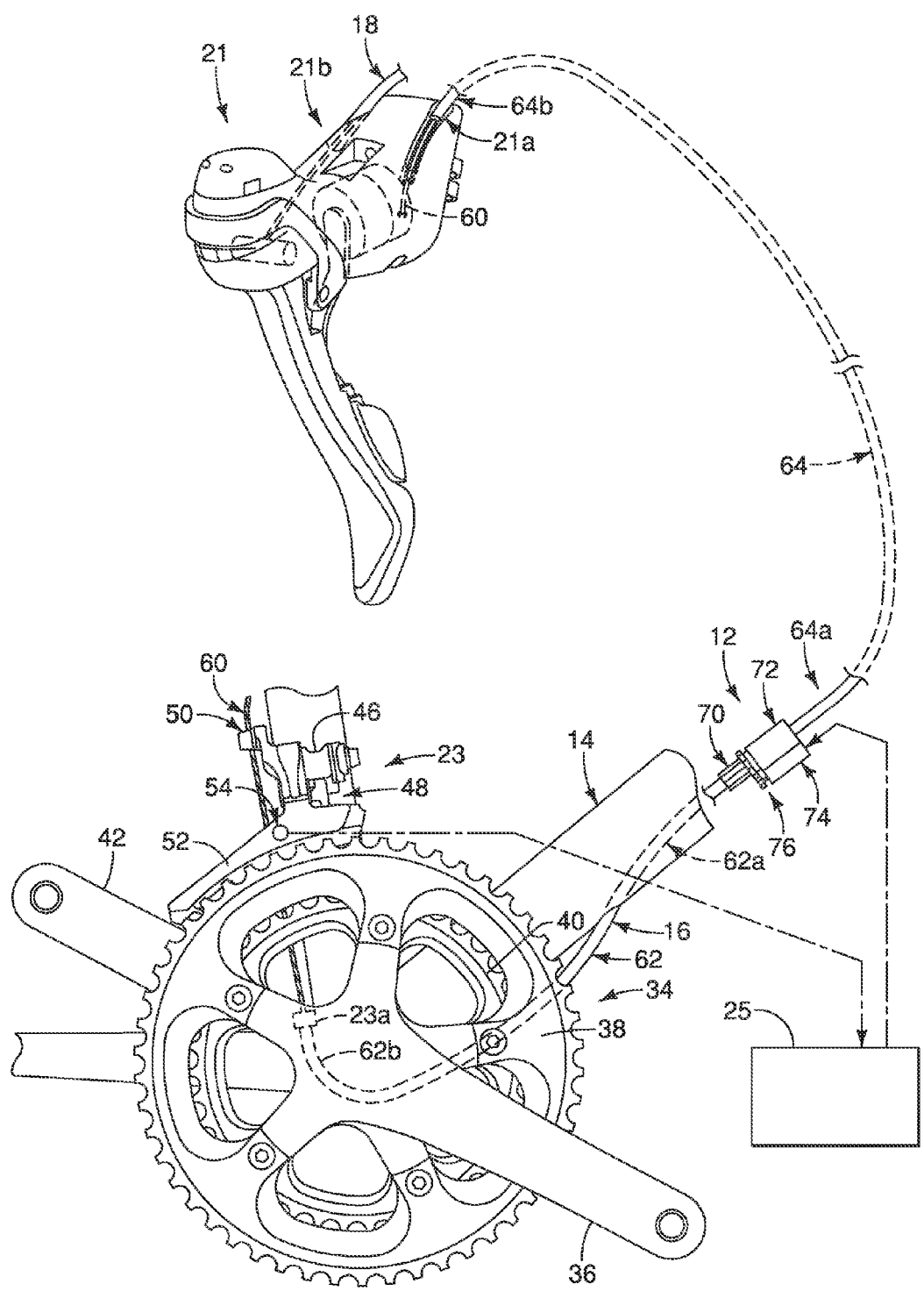
FIG. 2 is a side elevational view of a portion of the bicycle with a front derailleur installed thereon, with the cable adjusting unit adjusting a bicycle control cable extending between the front derailleur and a second shifter of the bicycle.

In the illustrated embodiment, as illustrated in FIGS. 1 and 2, the cable adjusting unit 12 is disposed on a longitudinal middle portion of the bicycle control cable 16 that extends between the second shifter 21 and the front derailleur 23. The front derailleur 23 laterally moves the bicycle chain 26 with respect to a crank set 34 having a right crank arm 36 and two chain rings 38 and 40. A left crank arm 42 is attached to the right crank arm 36 via a crank axle (not shown) in a conventional manner. The front derailleur 23 is operated in a conventional manner by the second shifter 21 for selectively positioning the bicycle chain 26 over one of the chain rings 38 and 40 of the crank set 34.

As shown in FIG. 2, the front derailleur 23 basically includes a base member 46, an inner link 48, an outer link 50 and a chain guide 52. The chain guide 52 is usually biased in a given direction relative to the base member 46 by a spring (not shown) in a conventional manner. These components of the front derailleur 23 are basically conventional components, except for a noise sensor 54 attached to the chain guide 52 for detecting a noise of the chain guide 52 (e.g., a bicycle component). In the illustrated embodiment, the noise sensor 54 includes an accelerometer. Of course, the noise sensor 54 can be different types of noise sensors, e.g. microphone. Thus, the front derailleur 23 is configured and arranged to be operated by the bicycle control cable 16 in response to the operation of the second shifter 21 in a conventional manner. The bicycle control cable 16 is connected to the outer link 50 for applying a torque thereto in order to move the chain guide 52 between a retracted position and an extended position relative to the base member 46. In other words, the chain guide 52 is moved relative to the base member 46 by pulling and/or releasing the bicycle control cable 16 that is operatively coupled between the second shifter 21 and the outer link 50 of the front derailleur 23 for selectively positioning the bicycle chain 26 over one of the chain rings 38 and 40. Of course, it will be apparent to those skilled in the art from this disclosure that the front derailleur 23 can be different type of conventional front derailleur.

Figure 3:
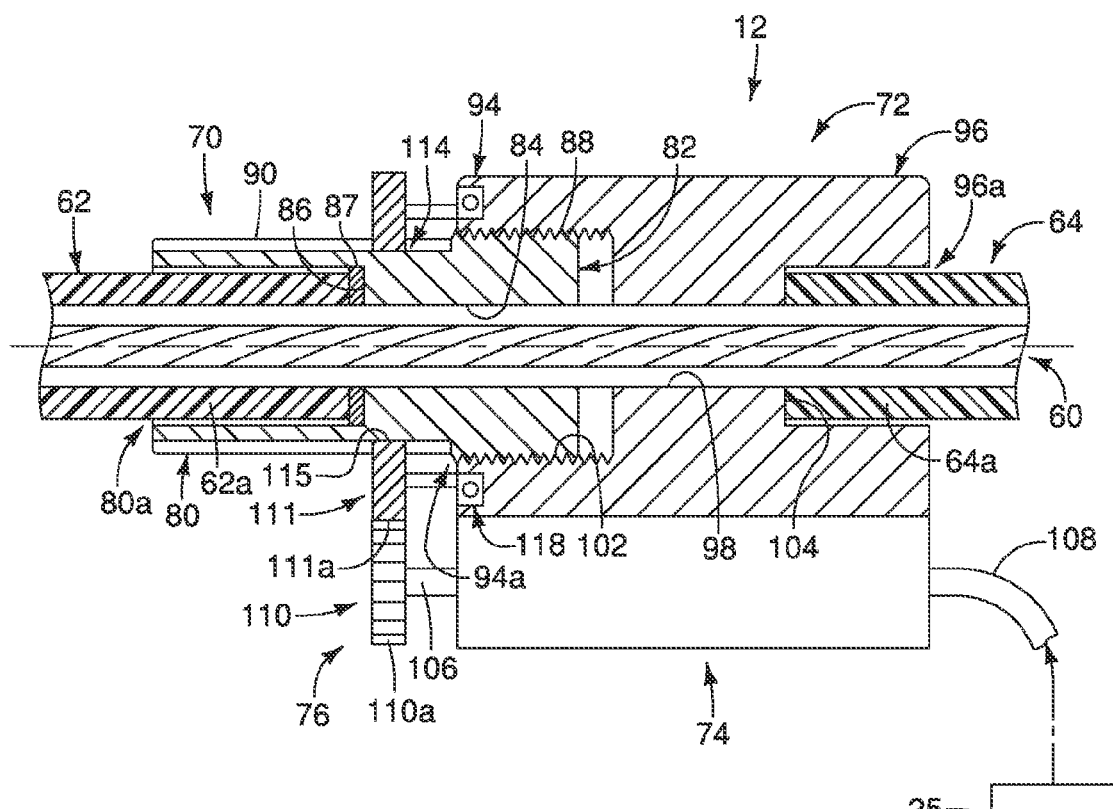
FIG. 3 is a longitudinal cross-sectional view of the cable adjusting unit illustrated in FIG. 1, with the cable adjusting unit coupled to the bicycle control cable.

As shown in FIGS. 2 and 3, the bicycle control cable 16 has an inner wire or cable 60, a first outer case 62 and a second outer case 64. The first outer case 62 is disposed over a first section of the inner cable 60, while the second outer case 64 is disposed over a second section of the inner cable 60. As best shown in FIG. 3, the cable adjusting unit 12 is disposed between adjacent ends 62a and 64a of the first and second outer cases 62 and 64 for effectively adjusting an overall effective length of the first and second outer cases 62 and 64 between non-adjacent or distal ends 62b and 64b of the first and second outer cases 62 and 64. The non-adjacent or distal ends 62b and 64b of the first and second outer cases 62 and 64 contact barrel adjusters or outer case holders 23a and 21a of the front derailleur 23 and the second shifter 21, respectively. The inner cable 60 is fixed at a first end to a cable connector of the outer link 50 in a conventional manner. The inner cable 60 is also fixed at a second end to a lever portion of the second shifter 21 in a conventional manner.

Basically, the cable adjusting unit 12 adjusts the overall effective length of the first and second outer cases 62 and 64 by moving the adjacent ends 62a and 64a of the first and second outer cases 62 and 64 away from each other along the inner cable 60. As shown in FIG. 3, the cable adjusting unit 12 includes a first member 70, a second member 72 and an actuator 74. The cable adjusting unit 12 also includes a drive train 76. The second member 72 is movably arranged with respect to the first member 70. The actuator 74 is operatively coupled to both of the first member 70 and the second member 72. The actuator 74 is arranged to relatively move the first member 70 with respect to the second member 72.

The first and second members 70 and 72 are basically a rigid hollow member, and made of a metallic material, a resin, or any other suitable material. The first and second members 70 and 72 are rotatably coupled with respect to each other. In particular, the first and second members 70 and 72 are coupled together with a thread coupling. The first and second members 70 and 72 are concentrically arranged with respect to each other.

The first member 70 includes a first end portion 80 with a first opening 80a, a second end portion 82, and a first through hole 84 extending through the first member 70. The first opening 80a has a larger diameter than the first through hole 84. The first opening 80a also has a diameter that is substantially equal to or slightly larger than the diameter of the adjacent end 62a of the first outer case 62. The adjacent end 62a of the first outer case 62 is fittedly coupled to the first opening 80a. The first member 70 further includes a first abutment 86 that faces with the first outer case 62 of the bicycle control cable 16 when the bicycle control cable 16 is attached to the cable adjusting unit 12. The first abutment 86 is disposed between the first opening 80a and the first through hole 84. In the illustrated embodiment, the first outer case 62 is coupled to the first opening 80a such that the adjacent end 62a contacts with the first abutment 86 via a thrust washer 87. Of course, alternatively, the first outer case 62 can be coupled to the first opening 80a such that the adjacent end 62a directly contacts with the first abutment 86. The first through hole 84 is configured such that the inner cable 60 of the bicycle control cable 16 is disposed through the first through hole 84 when the bicycle control cable 16 is attached to the cable adjusting unit 12. The second end portion 82 has an externally threaded section 88 on an outer peripheral surface of the second end portion 82. The first member 70 also has a plurality of serrations 90 on an outer peripheral surface of the first member 70. The serrations 90 longitudinally extend on the outer peripheral surface of the first member 70.

The second member 72 includes a first end portion 94 with a first opening 94a, a second end portion 96 with a second opening 96a, and a second through hole 98 extending through the second member 72 between the first and second openings 94a and 96a. The first opening 94a includes an internally threaded section 102 on an inner peripheral surface of the first opening 94a. The externally threaded section 88 of the first member 70 is threaded to the internally threaded section 102 of the second member 72 to form the thread coupling between the first and second members 70 and 72. The second opening 96a has a larger diameter than the second through hole 98. The second opening 96a also has a diameter that is substantially equal to or slightly larger than the diameter of the adjacent end 64a of the second outer case 64. The adjacent end 64a of the second outer case 64 is fittedly coupled to the second opening 96a. Of course, the adjacent end 64a can be fixedly coupled to the second opening 96a with an adhesive or any other suitable manner. The second member 72 further includes a second abutment 104 that faces with the second outer case 64 of the bicycle control cable 16 when the bicycle control cable 16 is attached to the cable adjusting unit 12. The second abutment 104 is disposed between the second opening 96a and the second through hole 98. The first and second abutments 86 and 104 axially face away from each other. In the illustrated embodiment, the second outer case 64 is coupled to the second opening 96a such that the adjacent end 64a directly contacts with the second abutment 104. Of course, alternatively, the second outer case 64 can be coupled to the second opening 96a such that the adjacent end 64a contacts with the second abutment 104 via a thrust washer. The second through hole 98 is configured such that the inner cable 60 of the bicycle control cable 16 is disposed through the second through hole 98 when the bicycle control cable 16 is attached to the cable adjusting unit 12.

As shown in FIG. 3, the first member 70 and the second member 72 are configured to be disposed between the adjacent ends 62a and 64a of the first and second outer cases 62 and 64 of the bicycle control cable 16. The adjacent ends 62a and 64a of the first and second outer cases 62 and 64 of the bicycle control cable 16 contact with the first and second abutments 86 and 104 of the first and second members 70 and 72, respectively. The inner cable 60 of the bicycle control cable 16 is disposed through the first and second through holes 84 and 98 of the first and second members 70 and 72. The first and second members 70 and 72 are axially movable with respect to each other in response to the relative rotation of the first and second members 70 and 72. Specifically, the externally threaded section 88 of the first member 70 and the internally threaded section 102 of the second member 72 cooperate to axially move the first and second members 70 and 72 with respect to each other along the inner cable 60 in response to the relative rotation between the first and second members 70 and 72. Basically, rotating the first member 70 relative to the second member 72 in a first rotational direction about the longitudinal axis of the inner cable 60 causes the first abutment 86 to move away from the second abutment 104 such that the adjacent end 62a of the first outer case 62 moves away from the adjacent end 64a of the second outer case 64, which increases the effective length of the first and second outer cases 62 and 64 and increases the tension of the inner cable 60. On the other hand, rotating the first member 70 relative to the second member 72 in a second rotational direction that is opposite the first rotational direction about the longitudinal axis of the inner cable 60 causes the first abutment 86 to move towards the second abutment 104 such that the adjacent end 62a of the first outer case 62 moves towards the adjacent end 64a of the second outer case 64, which decreases the effective length of the first and second outer cases 62 and 64 and decreases the tension of the inner cable 60. In the illustrated embodiment, the first and second members 70 and 72 are coupled together with the thread coupling such that the first member 70 is slidable with respect to the second member 72 in response to the rotational movement of the first member 70 relative to the second member 72. However, the first and second members 70 and 72 are coupled together in a different manner. In particular, the first and second members 70 and 72 have a cam mechanism, such as an eccentric cam and the like for transforming the rotational movement of the first member 70 relative to the second member 72 into the axial movement or slide of the first member 70 relative to the second member 72.

In the illustrated embodiment, the actuator 74 includes a motor. The actuator 74 is non-movably coupled to the second member 72. The actuator 74 has a drive shaft 106 that outputs rotational output of the actuator 74. The actuator 74 is operatively coupled to the cable controller 25. Specifically, the actuator 74 is electrically coupled to the cable controller 25 via an electrical cable 108 to receive a control signal from the cable controller 25. The cable controller 25 operates the actuator 74 upon receiving an input signal. In particular, the cable controller 25 receives the input signal from the noise sensor 54 that is electrically coupled to the cable controller 25. The actuator 74 is also electrically coupled to a battery (not shown) for power supply.

The drive train 76 is operatively coupled between the drive shaft 106 of the actuator 74 and the first member 70. The drive train 76 is configured to relatively rotate the first member 70 with respect to the second member 72 in response to the rotational movement of the drive shaft 106 of the actuator 74. The drive train 76 includes a first or input gear 110 and a second or output gear 111. The first gear 110 has external gear teeth 110a. The first gear 110 is fixedly coupled to the drive shaft 106 of the actuator 74 such that the first gear 110 rotates together with the drive shaft 106 of the actuator 74. The second gear 111 has external gear teeth 111a. The external gear teeth 111a of the second gear 111 mesh with the external gear teeth 110a of the first gear 110. The second gear 111 has a plurality of grooves 114 axially extending on an annular inner surface 115. The second gear 111 is non-rotatably coupled to the first member 70. In particular, the grooves 114 of the second gear 111 mesh with the serrations 90 of the first member 70. The first member 70 is axially slidable with respect to the second gear 111 while the grooves 114 of the second gear 111 mesh with the serrations 90 of the first member 70. The second gear 111 is rotatably supported on the second member 72 with a bearing 118 that is disposed between the second gear 111 and the first end portion 94 of the second member 72. An axial movement of the second gear 111 with respect to the second member 72 is restricted by the bearing 118. Since the bearing 118 can be a conventional component, the detailed configuration will be omitted for the sake of brevity. With this drive train 76, the rotational movement of the drive shaft 106 of the actuator 74 causes the second gear 111 to rotate via the first member 70, which also rotates the first member 70 together with the second gear 111. On the other hand, since the second gear 111 is axially non-movably coupled to the second member 72, the first member 70 axially slides with respect to the second gear 111 and the second member 72 while the first member 70 and the second gear 111 rotates together.

Figure 4:
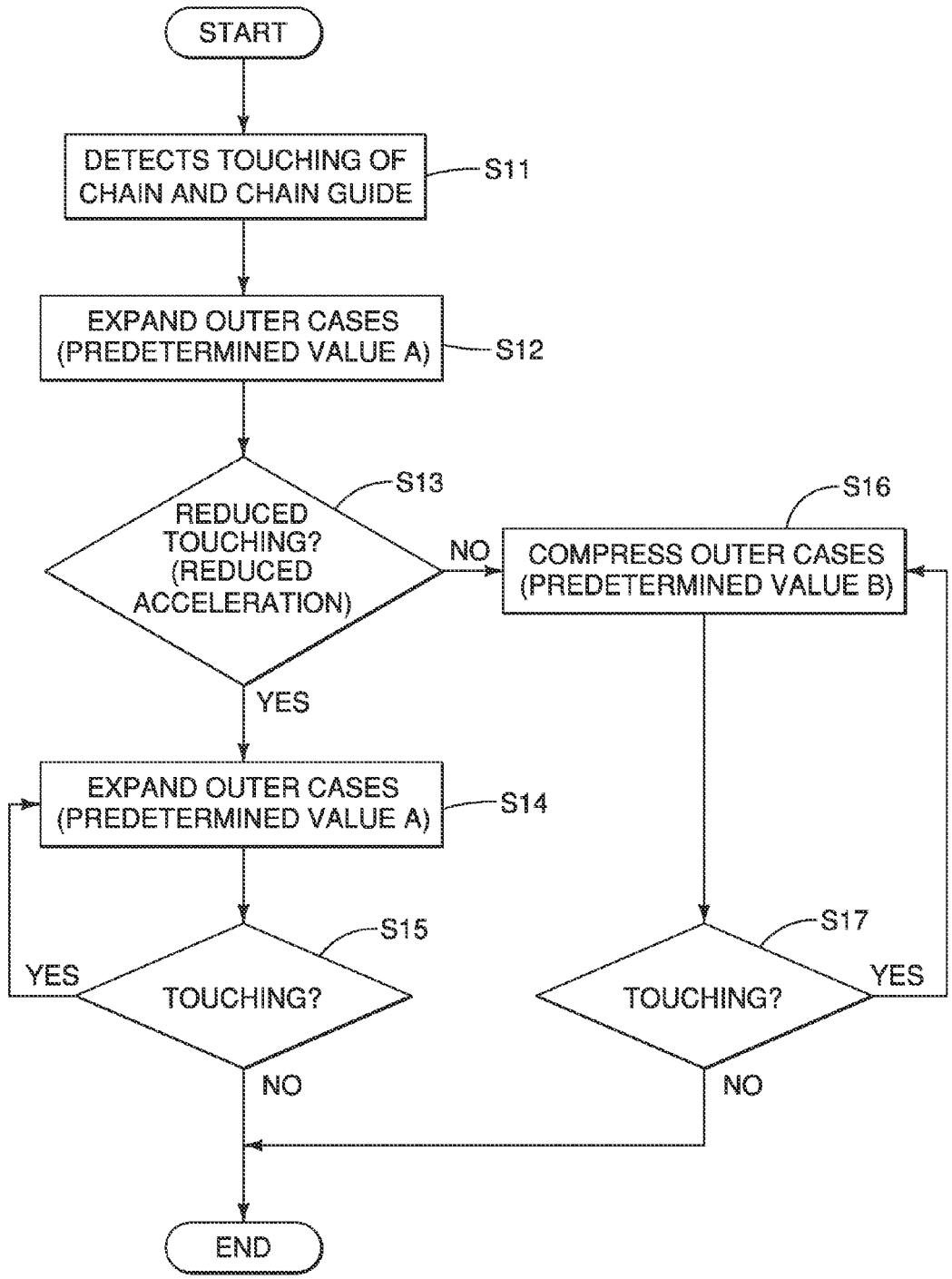
FIG. 4 is a flow chart illustrating a cable adjusting operation performed by the cable adjusting unit illustrated in FIG. 1.

Referring now to FIG. 4, a cable adjusting operation for adjusting the bicycle control cable 16 using the cable adjusting unit 12 will be discussed in detail. This cable adjusting operation is processed by the cable controller 25 based on the input signal from the noise sensor 54. Specifically, when the inner cable 60 of the bicycle control cable 16 becomes extended, derailleur positions of the front derailleur 23 will be misaligned relative to predetermined positions. This causes the bicycle chain 26 to contact with the chain guide 52 and makes noise due to the abrasion between the bicycle chain 26 and the chain guide 52. When the cycling computer 24 is booted up, the cable controller 25 automatically starts the cable adjusting operation shown in FIG. 4. Of course, it will be apparent from this disclosure that the cable controller 25 starts the cable adjusting operation based on a manual input to the cycling computer 24 from the rider or other user. In the illustrated embodiment, in step S11, the cable controller 25 detects touching of the bicycle chain 26 and the chain guide 52 by receiving the input signal from the noise sensor 54. The input signal from the noise sensor 54 is indicative of an acceleration or vibration of the chain guide 52.

In step S12, the cable controller 25 operates the cable adjusting unit 12 to expand the first and second outer cases 62 and 64 by a predetermined value A. This predetermined value A is preset in a memory of the cable controller 25. In particular, the cable controller 25 operates the actuator 74 of the cable adjusting unit 12 to move the first and second members 70 and 72 of the cable adjusting unit 12 away from each other by the predetermined value A. Then, in step S13, the cable controller 25 determines if the touching of the bicycle chain 26 and the chain guide 52 is reduced based on the input signal from the noise sensor 54. In particular, the cable controller 25 determines if the acceleration of the chain guide 52 indicated by the input signal is reduced. When the cable controller 25 determines that the touching of the bicycle chain 26 and the chain guide 52 is reduced ("Yes" in step S13), then, in step S14, the cable controller 25 further operates the cable adjusting unit 12 to expand the first and second outer cases 62 and 64 by the predetermined value A. When the cable controller 25 still detects the touching of the bicycle chain 26 and the chain guide 52 ("Yes" in Step S15), then, in step S14, the cable controller 25 further operates the cable adjusting unit 12 to expand the first and second outer cases 62 and 64 by the predetermined value A. When the cable controller 25 does not detects the touching of the bicycle chain 26 and the chain guide 52 ("No" in Step S15), then the cable controller 25 ends the cable adjusting operation. On the other hand, when the cable controller 25 determines that the touching of the bicycle chain 26 and the chain guide 52 is not reduced ("No" in step S13), then, in step S16, the cable controller 25 operates the cable adjusting unit 12 to compress the first and second outer cases 62 and 64 by a predetermined value B. This predetermined value B is preset in the memory of the cable controller 25. When the cable controller 25 still detects the touching of the bicycle chain 26 and the chain guide 52 ("Yes" in Step S17), then, in step S16, the cable controller 25 further operates the cable adjusting unit 12 to compress the first and second outer cases 62 and 64 by the predetermined value B. When the cable controller 25 does not detects the touching of the bicycle chain 26 and the chain guide 52 ("No" in Step S17), then the cable controller 25 ends the cable adjusting operation.

In the illustrated embodiment, the cable controller 25 is configured to operate the actuator 74 upon receiving the input signal from the noise sensor. Alternatively or additionally, the cable controller 25 can be manually operated. In particular, the cable controller 25 can be configured to receive an input signal from the cycling computer 24 (e.g., a manually operated device) that is electrically coupled to the cable controller 25. In this case, the cable controller 25 operates the actuator 74 upon receiving the input signal. Of course, it will be apparent to those skilled in the art from this disclosure that the cable controller 25 can receive the input signal from different types of manually operated devices.

Figure 5:
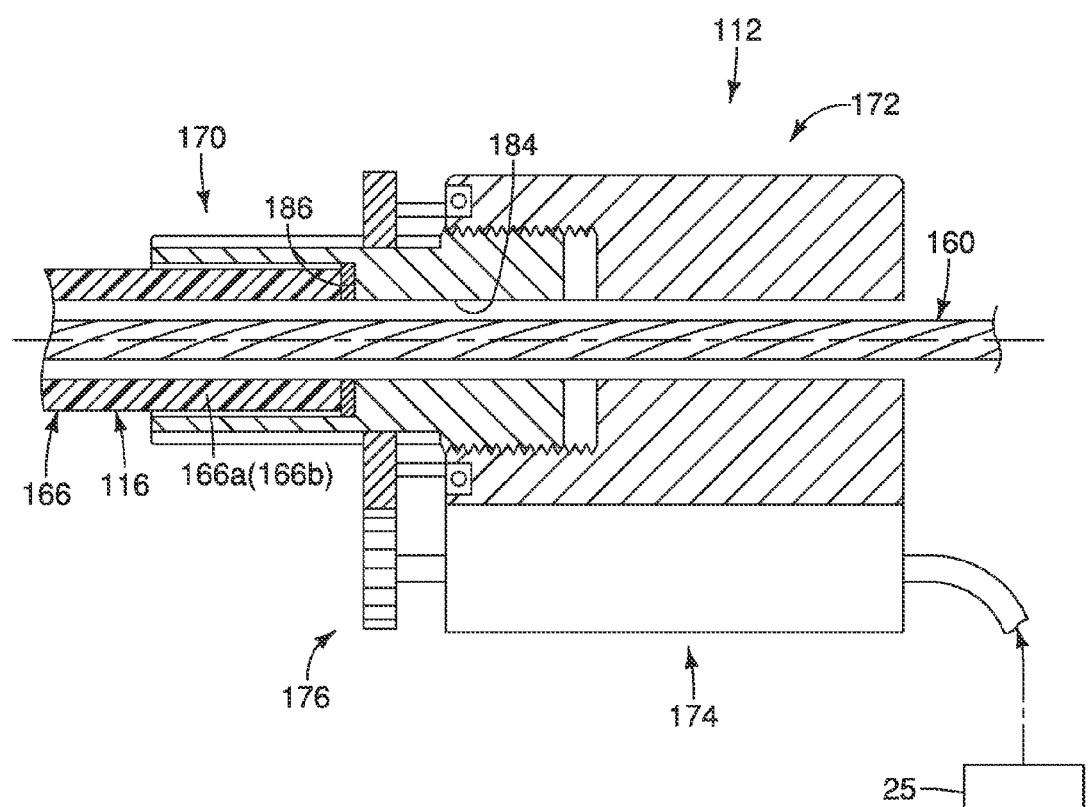
FIG. 5 is a longitudinal cross-sectional view of a modified cable adjusting unit in accordance with the first embodiment, with the cable adjusting unit coupled to a bicycle control cable.

In the illustrated embodiment, the bicycle control cable 16 has the inner cable 60 and the first and second outer cases 62 and 64, and the cable adjusting unit 12 is disposed between the first and second outer cases 62 and 64. In this case, the cable adjusting unit can be disposed inside the handlebar, inside the handlebar stem, inside the bicycle frame 14 or any other suitable location. However, the cable adjusting unit 12 can further be disposed at different locations along the bicycle control cable extending between the second shifter 21 and the front derailleur 23. For example, as illustrated in FIG. 5, a bicycle control cable 116 can include an inner cable 160 and a single outer case 166 (e.g., a first outer case) disposed over an entire section of the inner cable 160 except for first and second ends of the inner cable 160. The bicycle control cable 116 is operatively coupled between the second shifter 21 and the outer link 50 of the front derailleur 23. The first end of the inner cable 160 is fixed to the cable connector of the outer link 50 in a conventional manner, while the second end of the inner cable 160 is fixed to the lever portion of the second shifter 21 in a conventional manner. A cable adjusting unit 112 is identical to the cable adjusting unit 12 shown in FIG. 3, except that a second member 172 does not receive the outer case 166. In view of the similarity between the cable adjusting units 12 and 112, the descriptions of the parts of the cable adjusting unit 112 that are identical to the parts of the cable adjusting unit 12 will be omitted for the sake of brevity. However, the cable adjusting unit 112 has a first member 170, the second member 172, an actuator 174 and a drive train 176. The second member 172 is movably arranged with respect to the first member 170. The actuator 174 is operatively coupled to both the first member 170 and the second member 172. The actuator 174 is arranged to relatively move the first member 170 with respect to the second member 172. The first member 170 is disposed with respect to the bicycle control cable 116 such that a distal end 166a or 166b (e.g., an end) of the outer case 166 (e.g., a first outer case) of the bicycle control cable 116 contacts with a first abutment 186 of the first member 170, and such that the inner cable 160 of the bicycle control cable 116 is disposed through a first through hole 184 of the first member 170.

As shown in FIG. 5, the cable adjusting unit 112 can be disposed at one of distal ends 166a and 166b of the outer case 166. For example, the cable adjusting unit 112 can be disposed at the distal end 166a that is a closer end to the front derailleur 23 than the second shifter 21. In this case, the outer case holder 23a of the front derailleur 23 (see FIG. 2) is replaced with the cable adjusting unit 112. Specifically, the first member 170 of the cable adjusting unit 112 is coupled to the distal end 166a of the outer case 166. The second member 172 is fixedly coupled to the bicycle frame 14 (see FIG. 2). The second member 172 is formed as a part of the front derailleur 23 (e.g., a derailleur). With this configuration, when the cable controller 25 operates the actuator 174 of the cable adjusting unit 112 to axially move the first member 170 with respect to the second member 172, the overall effective length of the bicycle control cable 116 is changed, thereby adjusting the tension of the inner cable 160.

Alternatively or additionally, as also shown in FIG. 5, the cable adjusting unit 112 can be disposed at the distal end 166b that is a closer end to the second shifter 21 than the front derailleur 23. In this case, the outer case holder 211a of the second shifter 21 (see FIG. 2) is replaced with the cable adjusting unit 112. Specifically, the first member 170 of the cable adjusting unit 112 is coupled to the distal end 166b of the outer case 166. The second member 172 is formed as a part of the second shifter 21 (e.g., a shift operating device). In particular, the second member 172 can be integrally formed with a main body of the second shifter 21 as a one-piece, unitary member. With this configuration, when the cable controller 25 operates the actuator 174 of the cable adjusting unit 112 to axially move the first member 170 with respect to the second member 172, the overall effective length of the bicycle control cable 116 is changed, thereby adjusting the tension of the inner cable 160.

In the illustrated embodiment, while the cable adjusting unit 12 is used in connection with the front derailleur 23, the cable adjusting unit 12 can be used with other cable operated bicycle components as needed and/or desired. Specifically, in the illustrated embodiment, while the cable adjusting unit 12 is disposed on the route of the bicycle control cable 16, the cable adjusting unit 12 can also be disposed at any place on the routes of the bicycle control cables 15, 17 and 18.

Figure 6:
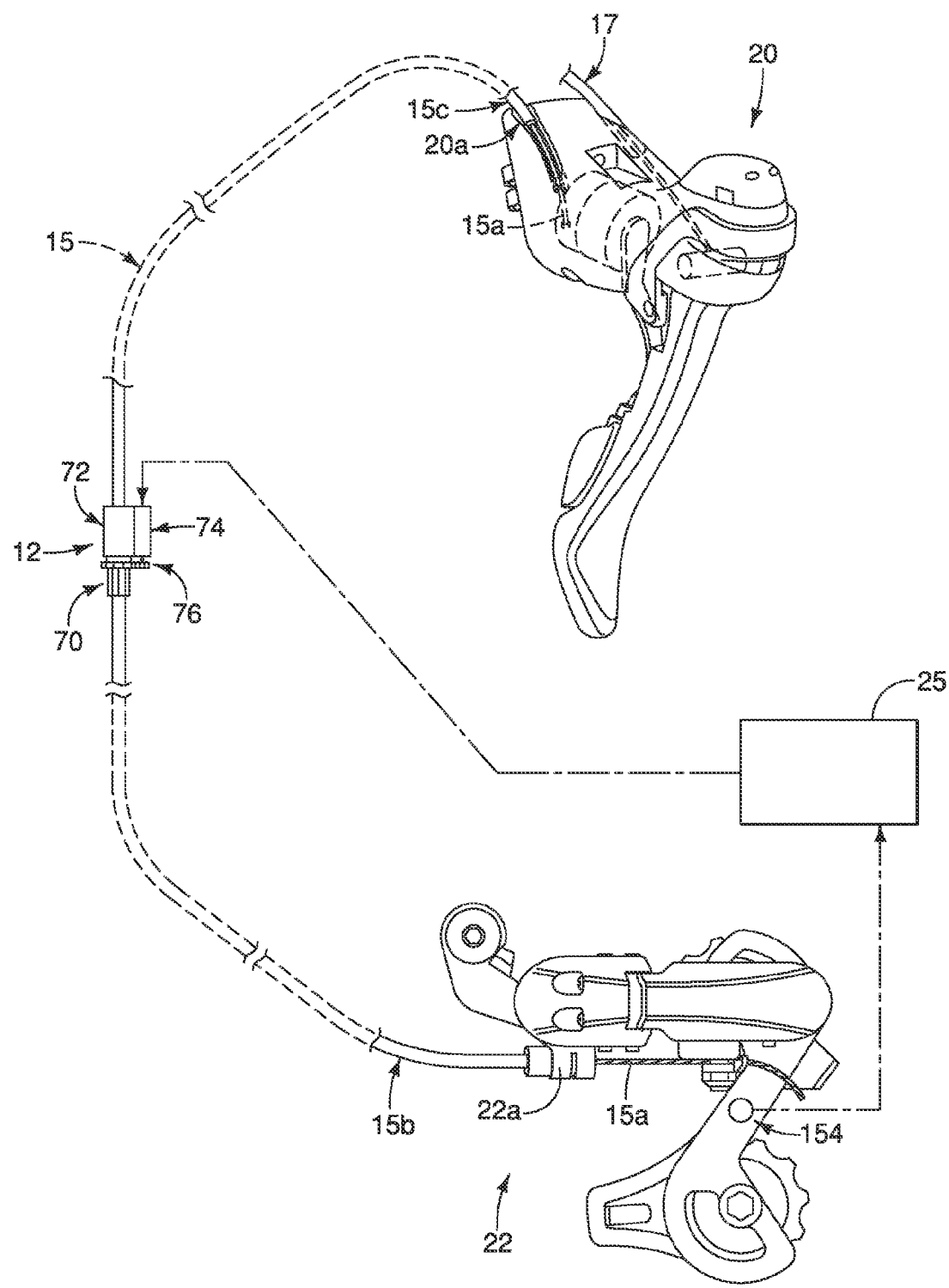
FIG. 6 is a side elevational view of a rear derailleur of the bicycle, with the cable adjusting unit in accordance with the first embodiment coupled to a bicycle control cable extending between the rear derailleur and a first shifter of the bicycle.

For example, as illustrated in FIG. 6, the cable adjusting unit 12 can be disposed on the bicycle control cable 15 between the first shifter 20 and the rear derailleur 22. In the illustrated embodiment, the bicycle control cable 15 has an inner cable 15a and first and second outer cases 15b and 15c. The bicycle control cable 15 is identical to the bicycle control cable 16. Thus, detailed configuration of the bicycle control cable 15 will be omitted for the sake of brevity. The adjacent ends of the first and second outer cases 15b and 15c are coupled to the first and second members 70 and 72 of the cable adjusting unit 12 (see FIG. 3), while the distal ends of the first and second outer cases 15b and 15c are supported by outer case holders 22a and 20a of the rear derailleur 22 and the first shifter 20, respectively. The first shifter 20 and the rear derailleur 22 are conventional, except that the rear derailleur 22 has a noise sensor 154. The noise sensor 154 is electrically coupled to the cable controller 25 in the same manner as the noise sensor 54 shown in FIG. 2. With this configuration, the cable adjusting unit 12 adjusts the overall effective length of the bicycle control cable 15. In particular, the cable controller 25 controls the cable adjusting unit 12 based on the input signal from the noise sensor 154 in a manner similar to the cable adjusting operation shown in FIG. 4. The cable adjusting operation of the cable adjusting unit 12 will not be discussed in detail for the sake of brevity. In this case, the cable adjusting unit can be disposed inside the handlebar, inside the handlebar stem, inside the bicycle frame 14 or any other suitable locations.

The cable adjusting unit 12 can further be disposed at different locations along the bicycle control cable extending between the first shifter 20 and the rear derailleur 22. For example, a bicycle control cable that include an inner cable and a single outer case disposed over an entire section of the inner cable except for first and second ends of the inner cable can be used between the first shifter 20 and the rear derailleur 22. This bicycle control cable is operatively coupled between the first shifter 20 and the rear derailleur 22. The first end of the inner cable is fixed to the rear derailleur 22 in a conventional manner, while the second end of the inner cable is fixed to the first shifter 20 in a conventional manner. In this case, the cable adjusting unit 112 shown in FIG. 5 can be used at one of distal ends of the single outer case. In particular, the cable adjusting unit 112 is disposed at the distal end of the single outer case that is a closer end to the rear derailleur 22 than the first shifter 20. In this case, the outer case holder 22a of the rear derailleur 22 (see FIG. 6) is replaced with the cable adjusting unit 112. Specifically, the first member 170 of the cable adjusting unit 112 is coupled to the distal end of the single outer case. The second member 172 is fixedly coupled to the rear derailleur 22 as a replacement of the outer case holder 22a. The second member 172 is formed as a part of the rear derailleur 22 (e.g., a derailleur). With this configuration, when the cable controller 25 operates the actuator 174 of the cable adjusting unit 112 to axially move the first member 170 with respect to the second member 172, the overall effective length of the bicycle control cable is changed, thereby adjusting the tension of the inner cable.

Alternatively or additionally, the cable adjusting unit 112 can also be disposed at the distal end of the single outer case that is a closer end to the first shifter 20 than the rear derailleur 22. In this case, the outer case holder 20a of the first shifter 20 (see FIG. 6) is replaced with the cable adjusting unit 112. Specifically, the first member 170 of the cable adjusting unit 112 is coupled to the distal end of the single outer case. The second member 172 is fixedly coupled to the first shifter 20 as a replacement of the outer case holder 20a. The second member 172 is formed as a part of the first shifter 20 (e.g., a shift operating device). In particular, the second member 172 can be integrally formed with a main body of the first shifter 20 as a one-piece, unitary member. With this configuration, when the cable controller 25 operates the actuator 174 of the cable adjusting unit 112 to axially move the first member 170 with respect to the second member 172, the overall effective length of the bicycle control cable is changed, thereby adjusting the tension of the inner cable.

Figure 7:
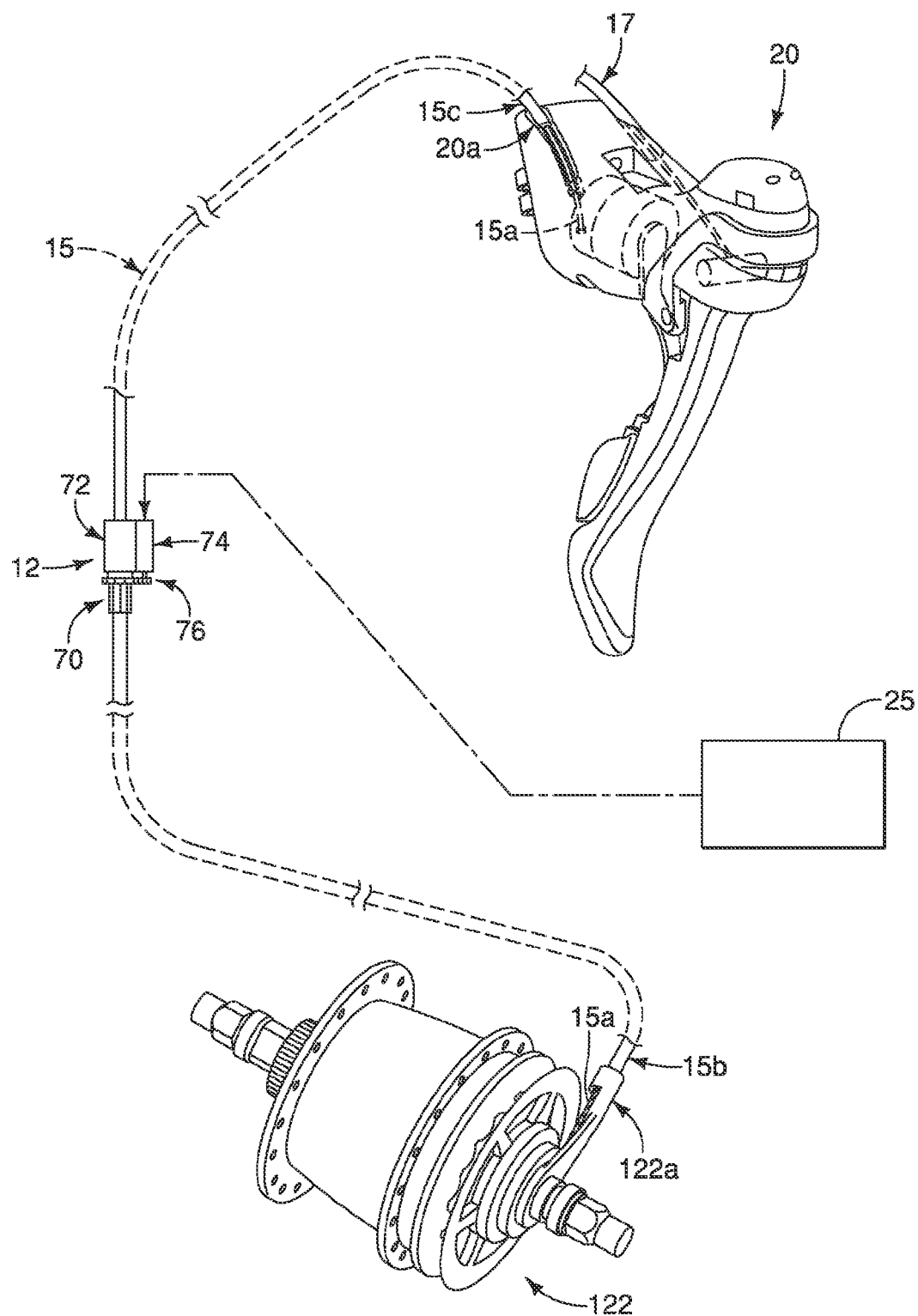
FIG. 7 is a perspective view of an internally geared hub of the bicycle, with the cable adjusting unit in accordance with the first embodiment coupled to the bicycle control cable extending between the internally geared hub and the first shifter of the bicycle.

Of course, it will be apparent from this disclosure that the bicycle 10 has different types of gear shifting mechanism. For example, as illustrated in FIG. 7, the bicycle 10 can include an internally geared hub 122 as a replacement of the rear derailleur 22 shown in FIG. 6 and a rear hub with sprockets. In this case, the internally geared hub 122 is operatively connected to the first shifter 20 via the bicycle control cable 15. In particular, the inner cable 15a is connected to the a cassette joint pulley for shifting operation of the internally geared hub 122, while the outer case 15b is connected to an outer case holder 122a of a cassette joint. Since this internally geared hub 122 is conventional, detailed configuration of the internally geared hub 122 will be omitted for the sake of brevity. In this case, the cable adjusting unit 12 can be disposed on the bicycle control cable 15 anywhere between the second shifter 21 and the internally geared hub 122. In this case, the cable adjusting unit 12 can be disposed inside the handlebar, inside the handlebar stem, inside the bicycle frame 14, and the like. Alternatively, the cable adjusting unit 112 can further be disposed on the bicycle control cable extending between the second shifter 21 and the internally geared hub 122. In this case, the second member 172 of the cable adjusting unit 112 forms a part of the second shifter 21 (e.g., a shift operating device) or the internally geared hub 122 (e.g., a derailleur or a transmission device).

Figure 8:
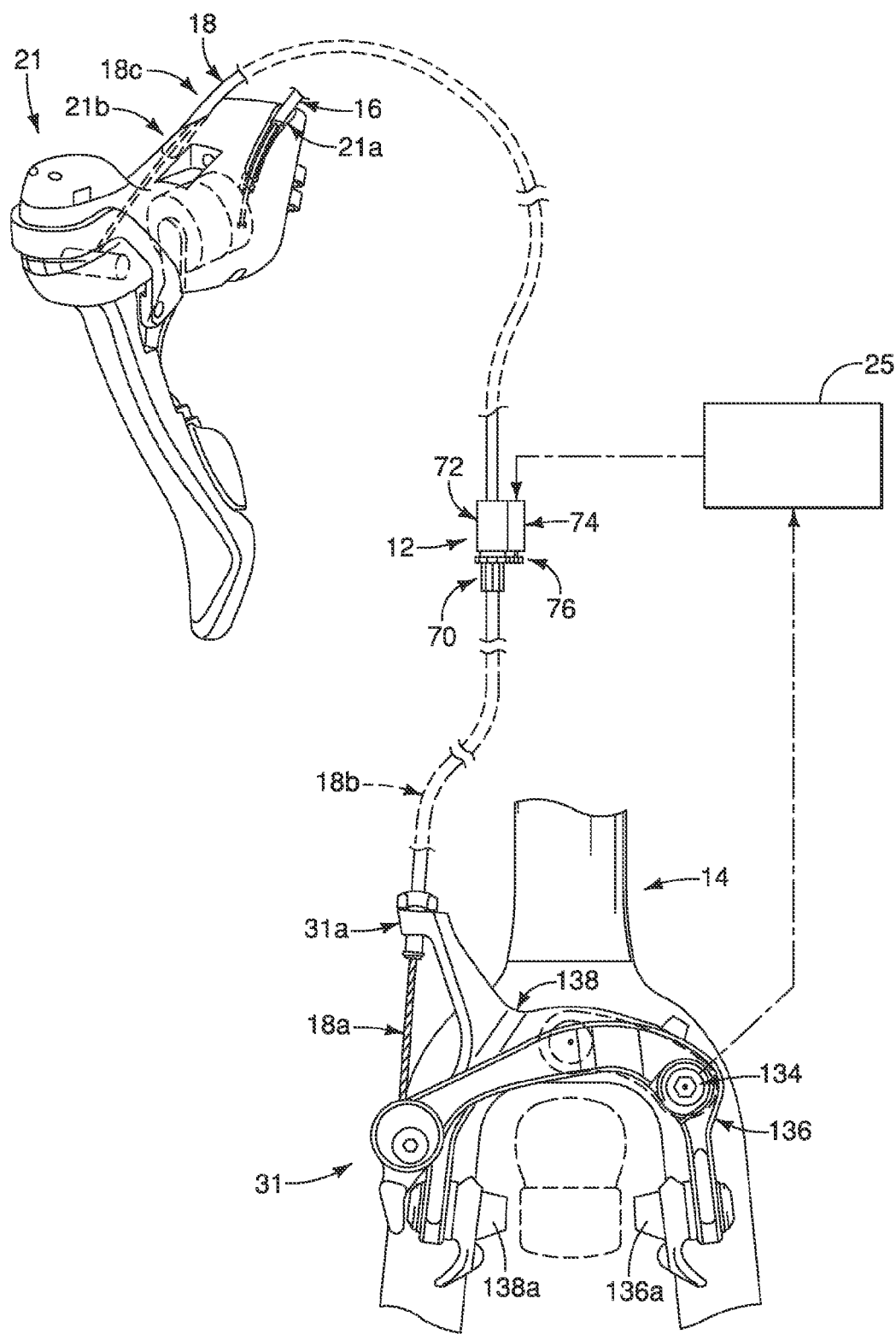
FIG. 8 is a front elevational view of a front brake of the bicycle, with the cable adjusting unit in accordance with the first embodiment coupled to a bicycle control cable extending between the front brake and the second shifter of the bicycle.

Furthermore, as illustrated in FIG. 8, the cable adjusting unit 12 can be disposed on the bicycle control cable 18 between the second shifter 21 and the front brake 31. In the illustrated embodiment, the bicycle control cable 18 has an inner cable 18a and first and second outer cases 18b and 18c. The bicycle control cable 18 is identical to the bicycle control cable 16. Thus, detailed configuration of the bicycle control cable 18 will be omitted for the sake of brevity. The adjacent ends of the first and second outer cases 18b and 18c are coupled to the first and second members 70 and 72 of the cable adjusting unit 12 (see FIG. 3), while the distal ends of the first and second outer cases 18b and 18c are supported by outer case holders 31a and 21b of the front brake 31 and the second shifter 21, respectively. The second shifter 21 and the front brake 31 are conventional, except that the front brake 31 has a brake sensor 134. Thus, the detailed configurations of the second shifter 21 and the front brake 31 will be omitted for the sake of brevity. The brake sensor 134 is electrically coupled to the cable controller 25 and detects a state of the front brake 31 (e.g., a bicycle brake). In particular, the brake sensor 134 includes a potentiometer to detect an angle of a brake arm 136. Of course, the brake sensor 134 can be different types of brake sensors that detect an angle of a brake arm 138, or detect a relative angle of the brake arms 136 and 138. With this configuration, the cable adjusting unit 12 adjusts the overall effective length of the bicycle control cable 18. In particular, the cable controller 25 receives the input signal from the brake sensor 134 and controls the cable adjusting unit 12 based on the input signal from the brake sensor 134. In this case, the cable adjusting unit 12 can be disposed inside the handlebar, inside the handlebar stem, inside the bicycle frame 14 or any other suitable locations.

Referring further to FIG. 8, the cable adjusting operation for adjusting the bicycle control cable 18 using the cable adjusting unit 12 will be discussed in detail. This cable adjusting operation is processed by the cable controller 25 based on the input signal from the brake sensor 134. Specifically, when the inner cable 18a of the bicycle control cable 18 becomes extended or brake shoes 136a and 138a of the front brake 31 are wore down due to the abrasion between the brake shoes 136a and 138a and a wheel rim, then the brake stroke of the second shifter 21 for brake operation will become deviated relative to a reference brake stroke. This causes a feeling of strangeness to the rider or other user while operating the front brake 31. Thus, the cable controller 25 adjust the entire effective length of the bicycle control cable 18 based on the input signal from the brake sensor 134. When the cycling computer 24 is booted up, the cable controller 25 automatically starts this cable adjusting operation. Of course, it will be apparent from this disclosure that the cable controller 25 starts the cable adjusting operation based on a manual input to the cycling computer 24 from the rider or other user. The memory of the cable controller 25 pre-stores a reference brake stroke angle (e.g., a degrees) for the brake stroke.

First, the cable controller 25 stores a rest angle that is indicated by the input signal from the brake sensor 134 while the second sifter 21 is not operated and the front brake 31 is in a rest position. Every time the front brake 31 is operated, the cable controller 25 stores an operation angle that is indicated by the input signal from the brake sensor 134 while the front brake 31 is operated, and then calculates the difference between the operation angle and the rest angle to obtain a brake stroke angle. The cable controller 25 stores the brake stroke angle in the memory every time the front brake 31 is operated, unless the brake stroke angle is less than a predetermined threshold value. Then, the cable controller 25 calculates a moving average (e.g., β degrees) of a predetermined number of previous brake stroke angles based on the brake stroke angles stored in the memory. As mentioned above, when the brake stroke angle is less than the predetermined threshold value, this brake stroke angle is not stored in the memory. Thus, the brake stroke angle that is less than the predetermined threshold value is not used to calculate the moving average. In the illustrated embodiment, the cable controller 25 calculates the moving average of previous two hundred brake stroke angles stored in the memory. This predetermined number (two hundred, for example) can be different number, such as fifty, one hundred and the like. The cable controller 25 further calculates the difference between the reference brake stroke angle (e.g., a degrees) and the calculated the moving average (e.g., β degrees) of previous two hundred brake stroke angles. If the difference (e.g., α-β) becomes more than a positive predetermined angler threshold (e.g., k degrees), then the cable controller 25 operates the cable adjusting unit 12 to compress the entire effective length of the bicycle control cable 18 by an amount corresponding to the predetermined angler threshold (e.g., k degrees). This predetermined angler threshold can be preset by the rider or other users. Alternatively or additionally, if the difference (e.g., α-β) becomes less than a negative predetermined angler threshold (e.g., -k' degrees), then the cable controller 25 operates the cable adjusting unit 12 to expand the entire effective length of the bicycle control cable 18 by an amount corresponding to the negative predetermined angler threshold (e.g., -k' degrees).

The cable adjusting unit 12 can further be disposed at different locations along the bicycle control cable extending between the second shifter 21 and the front brake 31. For example, a bicycle control cable that includes an inner cable and a single outer case disposed over an entire section of the inner cable except for first and second ends of the inner cable can be used between the second shifter 21 and the front brake 31. This bicycle control cable is operatively coupled between the second shifter 21 and the front brake 31. The first end of the inner cable is fixed to the front brake 31 in a conventional manner, while the second end of the inner cable is fixed to the second shifter 21 in a conventional manner. In this case, the cable adjusting unit 112 shown in FIG. 5 can be used at one of distal ends of the single outer case. In other words, the second member 172 of the cable adjusting unit 112 forms a part of the second shifter 21 (e.g., a brake operating device) or the front brake 31. In particular, the cable adjusting unit 112 is disposed at the distal end of the single outer case that is a closer end to the front brake 31 than the second shifter 21. In this case, the outer case holders 31a of the front brake 31 (see FIG. 8) is replaced with the cable adjusting unit 112. Specifically, the first member 170 of the cable adjusting unit 112 is coupled to the distal end of the single outer case. The second member 172 is fixedly coupled to the front brake 31 as a replacement of the outer case holders 31a, and formed as a part of the front brake 31. With this configuration, when the cable controller 25 operates the actuator 174 of the cable adjusting unit 112 to axially move the first member 170 with respect to the second member 172, the overall effective length of the bicycle control cable is changed, thereby adjusting the tension of the inner cable.

Alternatively or additionally, the cable adjusting unit 112 can also be disposed at the distal end of the single outer case that is a closer end to the second shifter 21 than the front brake 31. In this case, the outer case holder 21b of the second shifter 21 (see FIG. 8) is replaced with the cable adjusting unit 112. Specifically, the first member 170 of the cable adjusting unit 112 is coupled to the distal end of the single outer case. The second member 172 is fixedly coupled to the second shifter 21 as a replacement of the outer case holder 21a. The second member 172 is formed as a part of the second shifter 21 (e.g., a shift operating device). In particular, the second member 172 can be integrally formed with a main body of the second shifter 21 as a one-piece, unitary member. With this configuration, when the cable controller 25 operates the actuator 174 of the cable adjusting unit 112 to axially move the first member 170 with respect to the second member 172, the overall effective length of the bicycle control cable is changed, thereby adjusting the tension of the inner cable.

Of course, it will be apparent to those skilled in the art from this disclosure that the cable adjusting unit 12 shown in FIG. 3 or the cable adjusting unit 112 shown in FIG. 5 can be disposed on the bicycle control cable 17 between the first shifter 20 and the rear brake 30. In view of the similarity between the case in which the cable adjusting unit 12 or the cable adjusting unit 112 is disposed on the bicycle control cable 18 and the case in which the cable adjusting unit 12 or the cable adjusting unit 112 is disposed on the bicycle control cable 17, the detailed descriptions of the case in which the cable adjusting unit 12 or the cable adjusting unit 112 is disposed on the bicycle control cable 17 will be omitted for the sake of brevity. However, the cable adjusting unit 12 can be disposed on the bicycle control cable 17 anywhere between the first shifter 20 and the rear brake 30. In this case, the cable adjusting unit 12 can be disposed inside the handlebar, inside the handlebar stem, inside the bicycle frame 14, and the like. Also, the cable adjusting unit 112 can further be disposed on the bicycle control cable extending between the first shifter 20 and the rear brake 30. In this case, the second member 172 of the cable adjusting unit 112 forms a part of the first shifter 20 (e.g., a brake operating device) or the rear brake 30.

Second Embodiment

Figure 9:
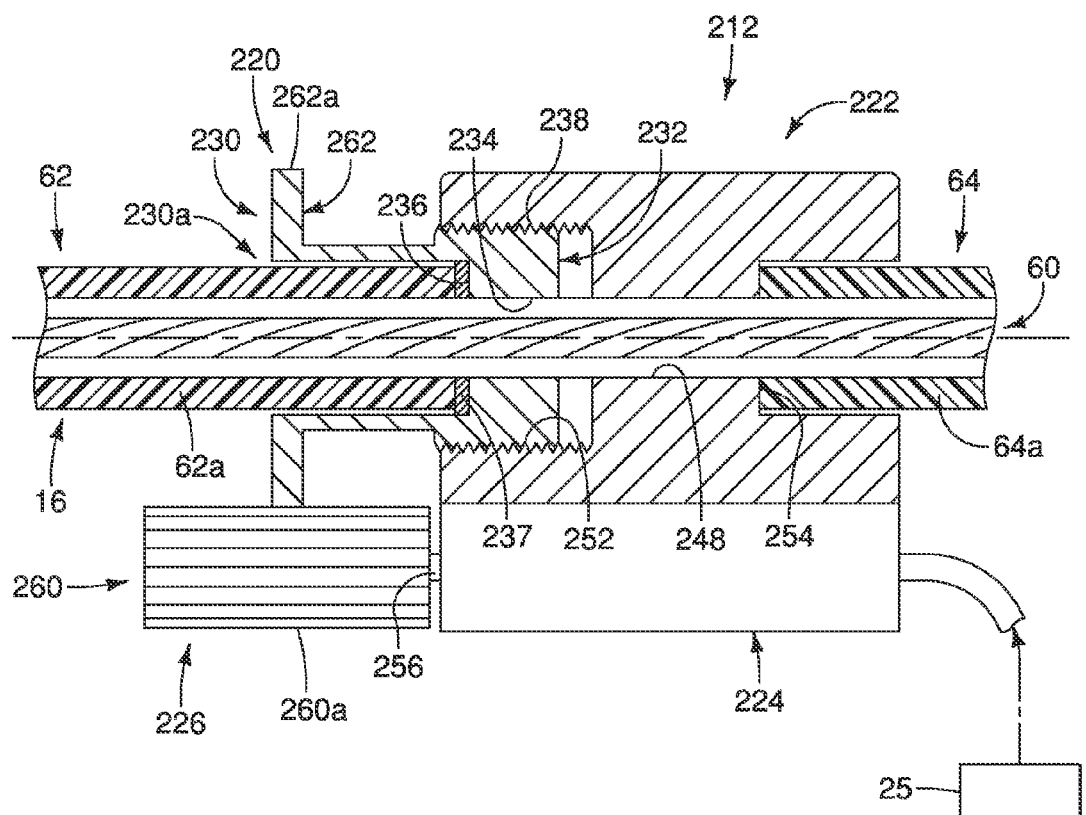
FIG. 9 is a longitudinal cross-sectional view of a cable adjusting unit in accordance with a second embodiment, with the cable adjusting unit coupled to a bicycle control cable.

Referring now to FIG. 9, a cable adjusting unit 212 in accordance with a second embodiment will now be explained.

In view of the similarity between the first and second embodiments, the parts of the second embodiment that are identical to the parts of the first embodiment will be given the same reference numerals as the parts of the first embodiment. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Basically, the cable adjusting unit 212 adjusts the overall effective length of the first and second outer cases 62 and 64 by moving the adjacent ends 62a and 64a of the first and second outer cases 62 and 64 away from each other along the inner cable 60. As shown in FIG. 9, the cable adjusting unit 212 includes a first member 220, a second member 222, an actuator 224 and a drive train 226. The second member 222 is movably arranged with respect to the first member 220. The actuator 224 is operatively coupled to both of the first member 220 and the second member 222. The actuator 224 is arranged to relatively move the first member 220 with respect to the second member 222. The second member 222 and the actuator 224 are identical to the second member 72 and the actuator 74 shown in FIG. 3. Thus, detailed description will be omitted for the sake of brevity.

The first and second members 220 and 222 are basically a solid hollow member, and made of a metallic material, a resin, or any other suitable material. The first and second members 220 and 222 are rotatably coupled with respect to each other. In particular, the first and second members 220 and 222 are coupled together with a thread coupling. The first and second members 220 and 222 are concentrically arranged with respect to each other.

The first member 220 includes a first end portion 230 with a first opening 230a, a second end portion 232, and a first through hole 234 extending through the first member 220. The first opening 230a has a larger diameter than the first through hole 234. The first opening 230a also has a diameter that is substantially equal to or slightly larger than the diameter of the adjacent end 62a of the first outer case 62. The adjacent end 62a of the first outer case 62 is fittedly coupled to the first opening 230a. The first member 220 further includes a first abutment 236 that faces with the first outer case 62 of the bicycle control cable 16 when the bicycle control cable 16 is attached to the cable adjusting unit 212. The first abutment 236 is disposed between the first opening 230a and the first through hole 234. In the illustrated embodiment, the first outer case 62 is coupled to the first opening 230a such that the adjacent end 62a contacts with the first abutment 236 via a thrust washer 237. Of course, alternatively, the first outer case 62 can be coupled to the first opening 230a such that the adjacent end 62a directly contacts with the first abutment 236. The first through hole 234 is configured such that the inner cable 60 of the bicycle control cable 16 is disposed through the first through hole 234 when the bicycle control cable 16 is attached to the cable adjusting unit 212. The second end portion 232 has an externally threaded section 238 on an outer peripheral surface of the second end portion 232.

The externally threaded section 238 of the first member 220 is threaded to an internally threaded section 252 of the second member 222 to form the thread coupling between the first and second members 220 and 222.

As shown in FIG. 9, the first member 220 and the second member 222 are configured to be disposed between the adjacent ends 62a and 64a of the first and second outer cases 62 and 64 of the bicycle control cable 16. The adjacent ends 62a and 64a of the first and second outer cases 62 and 64 of the bicycle control cable 16 contact with the first abutment 236 of the first member 220 and a second abutment 254 of the second member 222, respectively. The inner cable 60 of the bicycle control cable 16 is disposed through the first through hole 234 of the first member 220 and a second through hole 248 of the second member 222. The first and second members 220 and 222 are axially movable with respect to each other in response to the relative rotation of the first and second members 220 and 222. Specifically, the externally threaded section 238 of the first member 220 and the internally threaded section 252 of the second member 222 cooperate to axially move the first and second members 220 and 222 with respect to each other along the inner cable 60 in response to the relative rotation between the first and second members 220 and 222. Basically, rotating the first member 220 relative to the second member 222 in a first rotational direction about the longitudinal axis of the inner cable 60 causes the first abutment 236 to move away from the second abutment 254 such that the adjacent end 62a of the first outer case 62 moves away from the adjacent end 64a of the second outer case 64, which increases the effective length of the first and second outer cases 62 and 64 and increases the tension of the inner cable 60. On the other hand, rotating the first member 220 relative to the second member 222 in a second rotational direction that is opposite the first rotational direction about the longitudinal axis of the inner cable 60 causes the first abutment 236 to move towards the second abutment 254 such that the adjacent end 62a of the first outer case 62 moves towards the adjacent end 64a of the second outer case 64, which decreases the effective length of the first and second outer cases 62 and 64 and decreases the tension of the inner cable 60.

The drive train 226 is operatively coupled between a drive shaft 256 of the actuator 224 and the first member 220. The drive train 226 is configured to relatively rotate the first member 220 with respect to the second member 222 in response to the rotational movement of the drive shaft 256 of the actuator 224. The drive train 226 includes a first or input gear 260 and a second or output gear 262. The first gear 260 has external gear teeth 260a. The first gear 260 is fixedly coupled to the drive shaft 256 of the actuator 224 such that the first gear 260 rotates together with the drive shaft 256 of the actuator 224. The first gear 260 has an axial length that is longer than an entire axial moving range of the first member 220 with respect to the second member 222.

The second gear 262 has external gear teeth 262a. The external gear teeth 262a of the second gear 262 axially slidably mesh with the external gear teeth 260a of the first gear 260. The second gear 262 is fixedly coupled to an outer peripheral surface of the first member 220. In the illustrated embodiment, the second gear 262 is integrally formed with the first member 220 as a one-piece, unitary member. The second gear 262 is non-rotatably and non-slidably coupled to the first member 220. The first member 220 is axially slidable with the second gear 262 with respect to the first gear 260 and the second member 222 while the second gear 262 mesh with the first gear 260. With this drive train 226, the rotational movement of the drive shaft 256 of the actuator 224 causes the second gear 262 to rotate with the first member 220. Since the second gear 262 is slidable with respect to the first gear 260, the first member 220 axially slides with the second gear 262 with respect to the second member 222 in response to the rotational movement of the first member 220.

In the illustrated embodiment, the cable adjusting unit 212 is disposed on the bicycle control cable 16. However, alternatively or additionally, it will be apparent to those skilled in the art from this disclosure that the cable adjusting unit 212 can be disposed on the bicycle control cables 15, 17 and 18.

Third Embodiment

Figure 10:
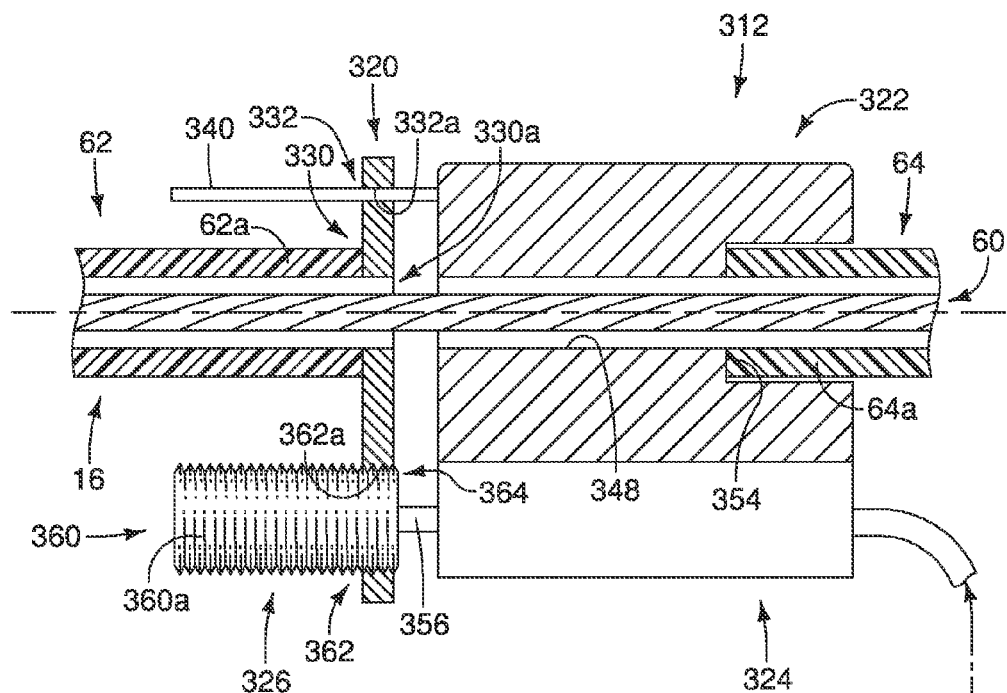
FIG. 10 is a longitudinal cross-sectional view of a cable adjusting unit in accordance with a third embodiment, with the cable adjusting unit coupled to a bicycle control cable.

Referring now to FIG. 10, a cable adjusting unit 312 in accordance with a third embodiment will now be explained.

In view of the similarity between the first and third embodiments, the parts of the third embodiment that are identical to the parts of the first embodiment will be given the same reference numerals as the parts of the first embodiment. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

Basically, the cable adjusting unit 312 adjusts the overall effective length of the first and second outer cases 62 and 64 by moving the adjacent ends 62a and 64a of the first and second outer cases 62 and 64 away from each other along the inner cable 60. As shown in FIG. 10, the cable adjusting unit 312 includes a first member 320, a second member 322, an actuator 324 and a drive train 326. The second member 322 is movably arranged with respect to the first member 320. The actuator 324 is operatively coupled to both of the first member 320 and the second member 322. The actuator 324 is arranged to relatively move the first member 320 with respect to the second member 322. The actuator 324 is identical to the actuator 74 shown in FIG. 3. Thus, detailed description will be omitted for the sake of brevity.

The first and second members 320 and 322 are basically a rigid member, and made of a metallic material, a resin, or any other suitable material. The first and second members 320 and 322 are non-rotatably and slidably coupled with respect to each other. In particular, the first and second members 320 and 322 are coupled together in a slidable manner. The first and second members 320 and 322 are concentrically arranged with respect to each other.

The first member 320 includes a cable attachment portion 330 with a first opening 330a and a guide portion 332 with a guide hole 332a. The first opening 330a has a diameter that is larger than the diameter of the inner cable 60 and smaller than the diameter of the adjacent end 62a of the first outer case 62. The adjacent end 62a of the first outer case 62 is fixedly coupled to the cable attachment portion 330 at an outer periphery of the first opening 330a. In the illustrated embodiment, the adjacent end 62a is fixedly coupled to the cable attachment portion 330 with an adhesive. The cable attachment portion 330 forms a first abutment that faces with the first outer case 62 of the bicycle control cable 16 when the bicycle control cable 16 is attached to the cable adjusting unit 312. The first opening 330a is configured such that the inner cable 60 of the bicycle control cable 16 is disposed through the first opening 330a when the bicycle control cable 16 is attached to the cable adjusting unit 312.

The second member 322 is identical to the second member 72 shown in FIG. 3, except that the second member 322 does not have the first opening 94a of the first end portion 94 for threadedly coupling the first member 70. The second member 322 further has a guide pin 340 that extends in a direction parallel to the longitudinal direction of the inner cable 60. The guide pin 340 extends through the guide hole 332a of the guide portion 332. The first member 320 is slidable with respect to the second member 322 along the guide pin 340.

As shown in FIG. 10, the first member 320 and the second member 322 are configured to be disposed between the adjacent ends 62a and 64a of the first and second outer cases 62 and 64 of the bicycle control cable 16. The adjacent ends 62a and 64a of the first and second outer cases 62 and 64 of the bicycle control cable 16 contact with the cable attachment portion 330 of the first member 320 and a second abutment 354 of the second member 322, respectively. The inner cable 60 of the bicycle control cable 16 is disposed through the first opening 330a of the first member 320 and a second through hole 348 of the second member 322.

The drive train 326 is operatively coupled between a drive shaft 356 of the actuator 324 and the first member 320. The drive train 326 is configured to relatively slide the first member 320 with respect to the second member 322 in response to the rotational movement of the drive shaft 356 of the actuator 324. The drive train 326 includes a worm drive having a worm part 360 and an internal screw part 362. The worm part 360 has an external spiral or screw 360a. The worm part 360 is fixedly coupled to the drive shaft 356 of the actuator 324 such that the worm part 360 rotates together with the drive shaft 356 of the actuator 324. The worm part 360 has an axial length that is longer than an entire axial moving range of the first member 320 with respect to the second member 322. In the illustrated embodiment, the worm part 360 is directly coupled to the drive shaft 356 of the actuator 324. Of course, it will be apparent from this disclosure that the drive train 326 further includes a reduction gear mechanism between the worm part 360 and the drive shaft 356 of the actuator 324.

The internal screw part 362 is formed on an inner peripheral face of a through hole 364 of the first member 320, and has internal spiral or screw 362a. The internal screw 362a of the internal screw part 362 axially slidably meshes with the external screw 360a of the worm part 360 in response to the rotational movement of the worm part 360. In the illustrated embodiment, the internal screw part 362 is integrally formed with the first member 320 as a one-piece, unitary member. The worm part 360 extends through the internal screw part 362 while meshing the external screw 360a with the internal screw 362a. The first member 320 is axially slidable with respect to the second member 322 in response to the rotational movement of the worm part 360 with respect to the internal screw part 362 while the internal screw part 362 meshes with the worm part 360. With this drive train 326, the rotational movement of the drive shaft 356 of the actuator 324 causes the first member 320 to axially slide along the guide pin 340.

The first and second members 320 and 322 are axially movable with respect to each other without rotating relative to each other. Specifically, the external screw 360a of the worm part 360 and the internal screw 362a of the internal screw part 362 cooperate to axially move the first and second members 320 and 322 with respect to each other along the inner cable 60 in response to the relative rotation between the worm part 360 and the internal screw part 362. Basically, rotating the worm part 360 relative to the internal screw part 362 in a first rotational direction about a rotational axis of the drive shaft 356 of the actuator 324 causes the first member 320 to move away from the second member 322 such that the adjacent end 62a of the first outer case 62 moves away from the adjacent end 64a of the second outer case 64, which increases the effective length of the first and second outer cases 62 and 64 and increases the tension of the inner cable 60. On the other hand, rotating the worm part 360 relative to the internal screw part 362 in a second rotational direction that is opposite the first rotational direction causes the first member 320 to move towards the second member 322 such that the adjacent end 62a of the first outer case 62 moves towards the adjacent end 64a of the second outer case 64, which decreases the effective length of the first and second outer cases 62 and 64 and decreases the tension of the inner cable 60.

In the illustrated embodiment, the cable adjusting unit 312 is disposed on the bicycle control cable 16. However, alternatively or additionally, it will be apparent to those skilled in the art from this disclosure that the cable adjusting unit 312 can be disposed on the bicycle control cables 15, 17 and 18.

Fourth Embodiment

Figure 11:
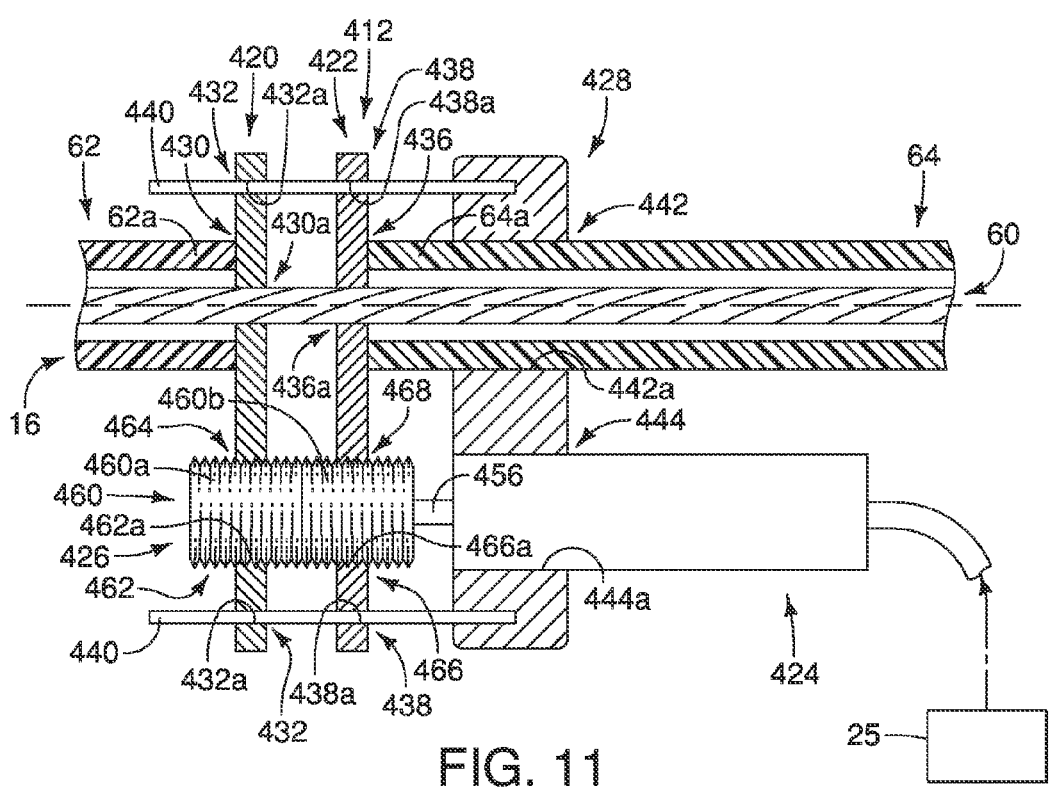
FIG. 11 is a longitudinal cross-sectional view of a cable adjusting unit in accordance with a fourth embodiment, with the cable adjusting unit coupled to a bicycle control cable.

Referring now to FIG. 11, a cable adjusting unit 412 in accordance with a fourth embodiment will now be explained.

In view of the similarity between the first and fourth embodiments, the parts of the fourth embodiment that are identical to the parts of the first embodiment will be given the same reference numerals as the parts of the first embodiment. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

Basically, the cable adjusting unit 412 adjusts the overall effective length of the first and second outer cases 62 and 64 by moving the adjacent ends 62a and 64a of the first and second outer cases 62 and 64 away from each other along the inner cable 60. As shown in FIG. 11, the cable adjusting unit 412 includes a first member 420, a second member 422, an actuator 424, a drive train 426 and a support base 428. The second member 422 is movably arranged with respect to the first member 420. The actuator 424 is operatively coupled to both of the first member 420 and the second member 422. The actuator 424 is arranged to relatively move both the first member 420 and the second member 422 relative to each other. The actuator 424 is identical to the actuator 74 shown in FIG. 3. Thus, detailed description will be omitted for the sake of brevity.

The first and second members 420 and 422 are basically a rigid member, and made of a metallic material, a resin, or any other suitable material. The first and second members 420 and 422 are non-rotatably and slidably coupled with respect to each other. In particular, the first and second members 420 and 422 are coupled to the support base 428 in a slidable manner. The first and second members 420 and 422 are concentrically arranged with respect to each other. The first and second members 420 and 422 slides in opposite directions in response to the rotational movement of the actuator 424.

The first member 420 includes a first cable attachment portion 430 with a first opening 430a and a pair of first guide portions 432 each having a first guide hole 432a. The first opening 430a has a diameter that is larger than the diameter of the inner cable 60 and smaller than the diameter of the adjacent end 62a of the first outer case 62. The adjacent end 62a of the first outer case 62 is fixedly coupled to the first cable attachment portion 430 at an outer periphery of the first opening 430a. In the illustrated embodiment, the adjacent end 62a is fixedly coupled to the first cable attachment portion 430 with an adhesive. The first cable attachment portion 430 forms a first abutment that faces with the first outer case 62 of the bicycle control cable 16 when the bicycle control cable 16 is attached to the cable adjusting unit 412. The first opening 430a is configured such that the inner cable 60 of the bicycle control cable 16 is disposed through the first opening 430a when the bicycle control cable 16 is attached to the cable adjusting unit 412.

The second member 422 is a mirror symmetric member with respect to the first member 420. The second member 422 is disposed between the first member and the support base 428. The second member 422 includes a second cable attachment portion 436 with a second opening 436a and a pair of second guide portions 438 each having a second guide hole 438a. The second opening 436a has a diameter that is larger than the diameter of the inner cable 60 and smaller than the diameter of the adjacent end 64a of the second outer case 64. The adjacent end 64a of the second outer case 64 is fixedly coupled to the second cable attachment portion 436 at an outer periphery of the second opening 436a. In the illustrated embodiment, the adjacent end 64a is fixedly coupled to the second cable attachment portion 436 with an adhesive. The second cable attachment portion 436 forms a second abutment that faces with the second outer case 64 of the bicycle control cable 16 when the bicycle control cable 16 is attached to the cable adjusting unit 412. The second opening 436a is configured such that the inner cable 60 of the bicycle control cable 16 is disposed through the second opening 436a when the bicycle control cable 16 is attached to the cable adjusting unit 412.

The support base 428 supports the first and second members 420 and 422, and the actuator 424. In the illustrated embodiment, the support base 428 slidably supports the first and second members 420 and 422. In particular, the support base 428 has a pair of guide pins 440 that extends in a direction parallel to the longitudinal direction of the inner cable 60. The guide pins 440 extend through the second guide holes 438a of the second member 422 and the first guide holes 432a of the first member 420. The first and second members 420 and 422 are slidable with respect to the support base 428 along the guide pins 440. The support base 428 further has a cable support portion 442 and an actuator support portion 444. The cable support portion 442 has a through hole 442a through which the second outer case 64 is slidably disposed. The actuator support portion 444 has a through hole 444a in which the actuator 424 is fixedly coupled to the support base 428.

As shown in FIG. 11, the first member 420 and the second member 422 are configured to be disposed between the adjacent ends 62a and 64a of the first and second outer cases 62 and 64 of the bicycle control cable 16. The adjacent ends 62a and 64a of the first and second outer cases 62 and 64 of the bicycle control cable 16 contact with the first and second cable attachment portions 430 and 436 of the first and second members 420 and 422, respectively. The inner cable 60 of the bicycle control cable 16 is disposed through the first and second openings 430a and 436a of the first and second members 420 and 422.

The drive train 426 is operatively coupled between a drive shaft 456 of the actuator 424 and the first and second members 420 and 422. The drive train 426 is configured to relatively slide the first member 420 and the second member 422 in the opposite directions, respectively, in response to the rotational movement of the drive shaft 456 of the actuator 424. The drive train 426 includes a worm drive having a worm part 460, a first internal screw part 462 and a second internal screw part 466.

The worm part 460 has a first external spiral or screw 460a and a second external spiral or screw 460b. The worm part 460 is fixedly coupled to the drive shaft 456 of the actuator 424 such that the worm part 460 rotates together with the drive shaft 456 of the actuator 424. The worm part 460 has an axial length that is longer than an entire axial moving range of the first member 420 with respect to the second member 422. The first and second external screws 460a and 460b are opposite spirals or screws. In the illustrated embodiment, the first external screw 460a has a left-hand thread, while the second external screw 460b has a right-hand thread. Of course, the first external screw 460a can have a right-hand thread, while the second external screw 460b can have a left-hand thread. Furthermore, in the illustrated embodiment, the worm part 460 is directly coupled to the drive shaft 456 of the actuator 424. Of course, it will be apparent from this disclosure that the drive train 426 further includes a reduction gear mechanism between the worm part 460 and the drive shaft 456 of the actuator 424.

The first internal screw part 462 is formed on an inner peripheral face of a through hole 464 of the first member 420, and has a first internal spiral or screw 462a. The first internal screw 462a of the first internal screw part 462 axially slidably meshes with the first external screw 460a of the worm part 460 in response to the rotational movement of the worm part 460. In the illustrated embodiment, the first internal screw part 462 is integrally formed with the first member 420 as a one-piece, unitary member. The second internal screw part 466 is formed on an inner peripheral face of a through hole 468 of the second member 422, and has a second internal spiral or screw 466a. The second internal screw 466a of the second internal screw part 466 axially slidably meshes with the second external screw 460b of the worm part 460 in response to the rotational movement of the worm part 460. In the illustrated embodiment, the second internal screw part 466 is integrally formed with the second member 422 as a one-piece, unitary member.

The worm part 460 extends through the first and second internal screw parts 462 and 466 while meshing the first and second external screws 460a and 460b with the first and second internal screws 462a and 466a, respectively. The first and second members 420 and 422 are axially slidable in opposite directions in response to the rotational movement of the worm part 460 with respect to the first and second internal screw parts 462 and 466 while the first and second internal screw parts 462 and 466 mesh with the worm part 460. With this drive train 426, the rotational movement of the drive shaft 456 of the actuator 424 causes the first and second members 420 and 422 to axially slide along the guide pins 440 in opposite directions.

The first and second members 420 and 422 are axially movable with respect to each other without rotating relative to each other. Specifically, the first and second external screws 460a and 460b of the worm part 460 and the first and second internal screws 462a and 466a of the first and second members 420 and 422 cooperate to axially move the first and second members 420 and 422 with respect to each other along the inner cable 60 in response to the rotation of the worm part 460. Basically, rotating the worm part 460 relative to the first and second internal screw parts 462 and 466 in a first rotational direction about a rotational axis of the drive shaft 456 of the actuator 424 causes the first and second members 420 and 422 to move away from each other such that the adjacent end 62a of the first outer case 62 moves away from the adjacent end 64a of the second outer case 64, which increases the effective length of the first and second outer cases 62 and 64 and increases the tension of the inner cable 60. On the other hand, rotating the worm part 460 relative to the first and second internal screw parts 462 and 466 in a second rotational direction that is opposite the first rotational direction causes the first and second members 420 and 422 to move towards each other such that the adjacent end 62a of the first outer case 62 moves towards the adjacent end 64a of the second outer case 64, which decreases the effective length of the first and second outer cases 62 and 64 and decreases the tension of the inner cable 60.

In the illustrated embodiment, the cable adjusting unit 412 is disposed on the bicycle control cable 16. However, alternatively or additionally, it will be apparent to those skilled in the art from this disclosure that the cable adjusting unit 412 can be disposed on the bicycle control cables 15, 17 and 18.

Fifth Embodiment

Figure 12:
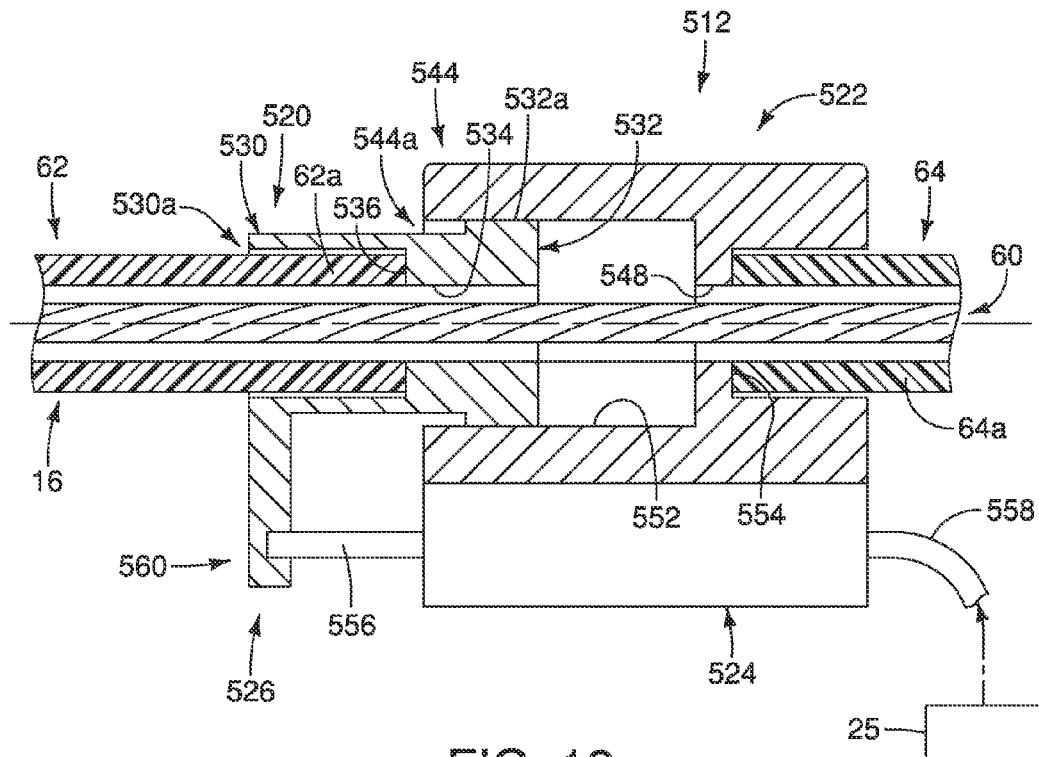
FIG. 12 is a longitudinal cross-sectional view of a cable adjusting unit in accordance with a fifth embodiment, with the cable adjusting unit coupled to a bicycle control cable.

Referring now to FIG. 12, a cable adjusting unit 512 in accordance with a fifth embodiment will now be explained.

In view of the similarity between the first and fifth embodiments, the parts of the fifth embodiment that are identical to the parts of the first embodiment will be given the same reference numerals as the parts of the first embodiment. In any event, the descriptions of the parts of the fifth embodiment that are substantially identical to the parts of the first embodiment may be omitted for the sake of brevity. However, it will be apparent to those skilled in the art from this disclosure that the descriptions and illustrations of the first embodiment also apply to this fifth embodiment, except as discussed and/or illustrated herein.

Basically, the cable adjusting unit 512 adjusts the overall effective length of the first and second outer cases 62 and 64 by moving the adjacent ends 62a and 64a of the first and second outer cases 62 and 64 away from each other along the inner cable 60. As shown in FIG. 12, the cable adjusting unit 512 includes a first member 520, a second member 522, an actuator 524 and a drive train 526. The second member 522 is movably arranged with respect to the first member 520. The actuator 524 is operatively coupled to both of the first member 520 and the second member 522. The actuator 524 is arranged to relatively move the first member 520 with respect to the second member 522.

The first and second members 520 and 522 are basically a rigid hollow member, and made of a metallic material, a resin, or any other suitable material. The first and second members 520 and 522 are slidably coupled with respect to each other. In particular, the first and second members 520 and 522 are slidable with respect to each other without rotating with respect to each other. Furthermore, in the illustrated embodiment, the first and second members 520 and 522 are non-rotatably coupled with respect to each other. The first and second members 520 and 522 are concentrically arranged with respect to each other.

The first member 520 includes a first end portion 530 with a first opening 530a, a second end portion 532, and a first through hole 534 extending through the first member 520. The first opening 530a has a larger diameter than the first through hole 534. The first opening 530a also has a diameter that is substantially equal to or slightly larger than the diameter of the adjacent end 62a of the first outer case 62. The adjacent end 62a of the first outer case 62 is fittedly coupled to the first opening 530a. In the illustrated embodiment, the adjacent end 62a of the first outer case 62 is fixedly coupled to the first opening 530a with an adhesive. The first member 520 further includes a first abutment 536 that faces with the first outer case 62 of the bicycle control cable 16 when the bicycle control cable 16 is attached to the cable adjusting unit 512. The first abutment 536 is disposed between the first opening 530a and the first through hole 534. In the illustrated embodiment, the first outer case 62 is coupled to the first opening 530a such that the adjacent end 62a directly contacts with the first abutment 536. Of course, alternatively, the first outer case 62 can be coupled to the first opening 530a such that the adjacent end 62a contacts with the first abutment 536 via a thrust washer. The first through hole 534 is configured such that the inner cable 60 of the bicycle control cable 16 is disposed through the first through hole 534 when the bicycle control cable 16 is attached to the cable adjusting unit 512. The second end portion 532 has a cylindrical outer peripheral surface 532a. In other words, the outer peripheral surface has no external thread.

The second member 522 is identical to the second member 72 shown in FIG. 3, except that the second member 522 does not have the internally threaded section 102 of the second member 72. Specifically, the second member 522 has a first opening 544a on a first end portion 544 of the second member 522. The first opening 544a has a cylindrical inner peripheral surface 552. The outer peripheral surface 532a of the first member 520 is slidably disposed within the inner peripheral surface 552 such that the second end portion 532 of the first member 520 slides along the inner peripheral surface 552 of the second member 522.

As shown in FIG. 12, the first member 520 and the second member 522 are configured to be disposed between the adjacent ends 62a and 64a of the first and second outer cases 62 and 64 of the bicycle control cable 16. The adjacent ends 62a and 64a of the first and second outer cases 62 and 64 of the bicycle control cable 16 contact with the first abutment 536 of the first member 520 and a second abutment 554 of the second member 522, respectively. The inner cable 60 of the bicycle control cable 16 is disposed through the first through hole 534 of the first member 520 and a second through hole 548 of the second member 522.

In the illustrated embodiment, the actuator 524 includes a solenoid. The actuator 574 is non-movably coupled to the second member 522. The actuator 524 has a drive shaft 556 that outputs axial movement of the actuator 524. The actuator 524 is operatively coupled to the cable controller 25. Specifically, the actuator 524 is electrically coupled to the cable controller 25 via an electrical cable 558 to receive a control signal from the cable controller 25. The cable controller 25 operates the actuator 524 upon receiving an input signal. In particular, the cable controller 25 receives the input signal from the noise sensor 54 (see FIG. 2) that is electrically coupled to the cable controller 25. The actuator 524 is also electrically coupled to a battery (not shown) for power supply.

The drive train 526 is operatively coupled between the drive shaft 556 of the actuator 524 and the first member 520. The drive train 526 is configured to relatively slide the first member 520 with respect to the second member 522 in response to the axial movement of the drive shaft 556 of the actuator 524. The drive train 526 includes an output member 560. The output member 560 is fixedly coupled to the drive shaft 556 of the actuator 524. The output member 560 is also fixedly coupled to the first member 520. In the illustrated embodiment, the output member 560 is integrally formed with the first member 520. The output member 560 slides together with the drive shaft 556 of the actuator 524 and the first member 520. With this drive train 526, the axial movement of the drive shaft 556 of the actuator 524 causes the first member 520 to slide with respect to the second member 522.

The first and second members 520 and 522 are axially slidable with respect to each other in response to the axial movement of the drive shaft 556 of the actuator 524. Specifically, the drive shaft 556 of the actuator 524 and the output member 560 of the drive train 526 cooperate to axially move the first and second members 520 and 522 with respect to each other along the inner cable 60. Basically, sliding the first member 520 away from the second member 522 along the inner cable 60 causes the first abutment 536 to move away from the second abutment 554 such that the adjacent end 62a of the first outer case 62 moves away from the adjacent end 64a of the second outer case 64, which increases the effective length of the first and second outer cases 62 and 64 and increases the tension of the inner cable 60. On the other hand, sliding the first member 520 towards the second member 522 along the inner cable 60 causes the first abutment 536 to move towards the second abutment 554 such that the adjacent end 62a of the first outer case 62 moves towards the adjacent end 64a of the second outer case 64, which decreases the effective length of the first and second outer cases 62 and 64 and decreases the tension of the inner cable 60.

In the illustrated embodiment, the cable adjusting unit 512 is disposed on the bicycle control cable 16. However, alternatively or additionally, it will be apparent to those skilled in the art from this disclosure that the cable adjusting unit 512 can be disposed on the bicycle control cables 15, 17 and 18.

Sixth Embodiment

Figure 13:
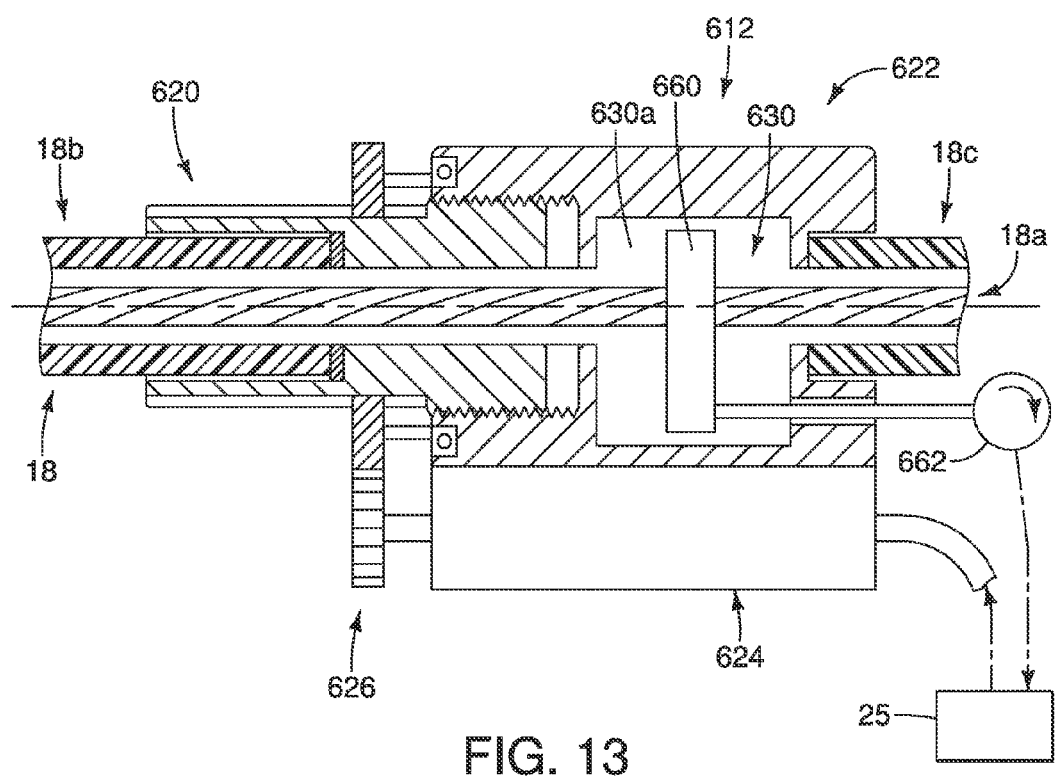
FIG. 13 is a longitudinal cross-sectional view of a cable adjusting unit in accordance with a sixth embodiment, with the cable adjusting unit coupled to a bicycle control cable.

Referring now to FIG. 13, a cable adjusting unit 612 in accordance with a sixth embodiment will now be explained.

In view of the similarity between the first and sixth embodiments, the parts of the fifth embodiment that are identical to the parts of the first embodiment will be given the same reference numerals as the parts of the first embodiment. In any event, the descriptions of the parts of the sixth embodiment that are substantially identical to the parts of the first embodiment may be omitted for the sake of brevity.

However, it will be apparent to those skilled in the art from this disclosure that the descriptions and illustrations of the first embodiment also apply to this sixth embodiment, except as discussed and/or illustrated herein.

Basically, the cable adjusting unit 612 adjusts the overall effective length of the first and second outer cases 18b and 18c of the bicycle control cable 18 (see FIG. 8) by moving the adjacent ends of the first and second outer cases 18b and 18c away from each other along the inner cable 18a. As shown in FIG. 13, the cable adjusting unit 612 includes a first member 620, a second member 622, an actuator 624 and a drive train 626. The second member 622 is movably arranged with respect to the first member 620. The actuator 624 is operatively coupled to both of the first member 620 and the second member 622. The actuator 624 is arranged to relatively move the first member 620 with respect to the second member 622.

The cable adjusting unit 612 is basically identical to the cable adjusting unit 12 shown in FIG. 3, except that the cable adjusting unit 612 is disposed on the bicycle control cable 18, that the cable adjusting unit 612 is coupled to a cable stroke sensor 662, and that the second member 622 further includes a sensor housing 630. The sensor housing 630 defines a housing space 630a for housing a sensor element 660. The sensor element 660 is fixedly coupled to the inner cable 18a of the bicycle control cable 18 within the housing space 630a of the second member 622. The sensor element 660 is mechanically connected to the cable stroke sensor 662 through an opening. The cable stroke sensor 662 includes a potentiometer, such as a linear potentiometer. The cable stroke sensor 662 detects an axial position of the sensor element 660, thereby detecting the cable stroke of the inner cable 18a. The cable stroke sensor 662 is electrically coupled to the cable controller 25 to output the detected axial position of the sensor element 660 to the cable controller 25.

The cable controller 25 calculates the cable stroke of the bicycle control cable 18 based on an input signal from the cable stroke sensor 662. In other words, the cable controller 25 is configured to receive the input signal from the cable stroke sensor 662 that is electrically coupled to the cable controller 25 and configured to detect the cable stroke of the bicycle control cable 18. The cable controller 25 is operatively coupled to the actuator 624. The cable controller 25 is configured to operate the actuator 624 upon receiving the input signal.

Referring further to FIGS. 8 and 13, the cable adjusting operation for adjusting the bicycle control cable 18 using the cable adjusting unit 12 will be discussed in detail. This cable adjusting operation is processed by the cable controller 25 based on the input signal from the cable stroke sensor 662. Specifically, when the bicycle control cable 18 becomes extended or brake shoes 136a and 138a of the front brake 31 are wore down due to the abrasion between the brake shoes 136a and 138a and a wheel rim, then the brake stroke of the second shifter 21 for brake operation will become deviated relative to a reference brake stroke. This causes a feeling of strangeness to the rider or other user while operating the front brake 31. Thus, the cable controller 25 adjusts the entire effective length of the bicycle control cable 18 based on the input signal from the cable stroke sensor 662. When the cycling computer 24 is booted up, the cable controller 25 automatically starts this cable adjusting operation. Of course, it will be apparent from this disclosure that the cable controller 25 starts the cable adjusting operation based on a manual input to the cycling computer 24 from the rider or other user. The memory of the cable controller 25 pre-stores a reference cable stroke value (e.g., a millimeters) for the brake stroke.

First, the cable controller 25 stores a rest position that is indicated by the input signal from the cable stroke sensor 662 while the second sifter 21 is not operated and the front brake 31 is in a rest position. Every time the front brake 31 is operated, the cable controller 25 stores an operation position that is indicated by the input signal from the cable stroke sensor 662 while the front brake 31 is operated, and then calculates the difference between the operation position and the rest position to obtain a cable stroke value. The cable controller 25 stores the cable stroke value in the memory every time the front brake 31 is operated, unless the cable stroke value is less than a predetermined threshold value. Then, the cable controller 25 calculates a moving average (e.g., β millimeters) of a predetermined number of previous cable stroke values based on the cable stroke values stored in the memory. As mentioned above, when the cable stroke value is less than the predetermined threshold value, this cable stroke value is not stored in the memory. Thus, the cable stroke value that is less than the predetermined threshold value is not used to calculate the moving average. In the illustrated embodiment, the cable controller 25 calculates the moving average of previous two hundred cable stroke values stored in the memory. This predetermined number (two hundred, for example) can be different number, such as fifty, one hundred and the like. The cable controller 25 further calculates the difference between the reference cable stroke value (e.g., a millimeters) and the calculated moving average (e.g., β millimeters) of previous two hundred cable stroke values. If the difference (e.g., α-β) becomes more than a positive predetermined threshold (e.g., k millimeters), then the cable controller 25 operates the cable adjusting unit 12 to compress the entire effective length of the bicycle control cable 18 by the predetermined threshold (e.g., k millimeters). This predetermined threshold can be preset by the rider or other users. Alternatively or additionally, if the difference (e.g., α-β) becomes less than a negative predetermined threshold (e.g., -k' millimeters), then the cable controller 25 operates the cable adjusting unit 12 to expand the entire effective length of the bicycle control cable 18 by the absolute value of the predetermined threshold (e.g., k' millimeters).

In the illustrated embodiment, the cable adjusting unit 612 is disposed on the bicycle control cable 18. However, alternatively or additionally, it will be apparent to those skilled in the art from this disclosure that the cable adjusting unit 612 can be disposed on the bicycle control cables 15, 16 and 17.

In the illustrated embodiment, the cable adjusting unit 612 is coupled to the cable stroke sensor 662 having a potentiometer for detecting the cable stroke of the bicycle control cable 18. However, the cable stroke sensor 662 can be different types of sensors.

Figure 14:
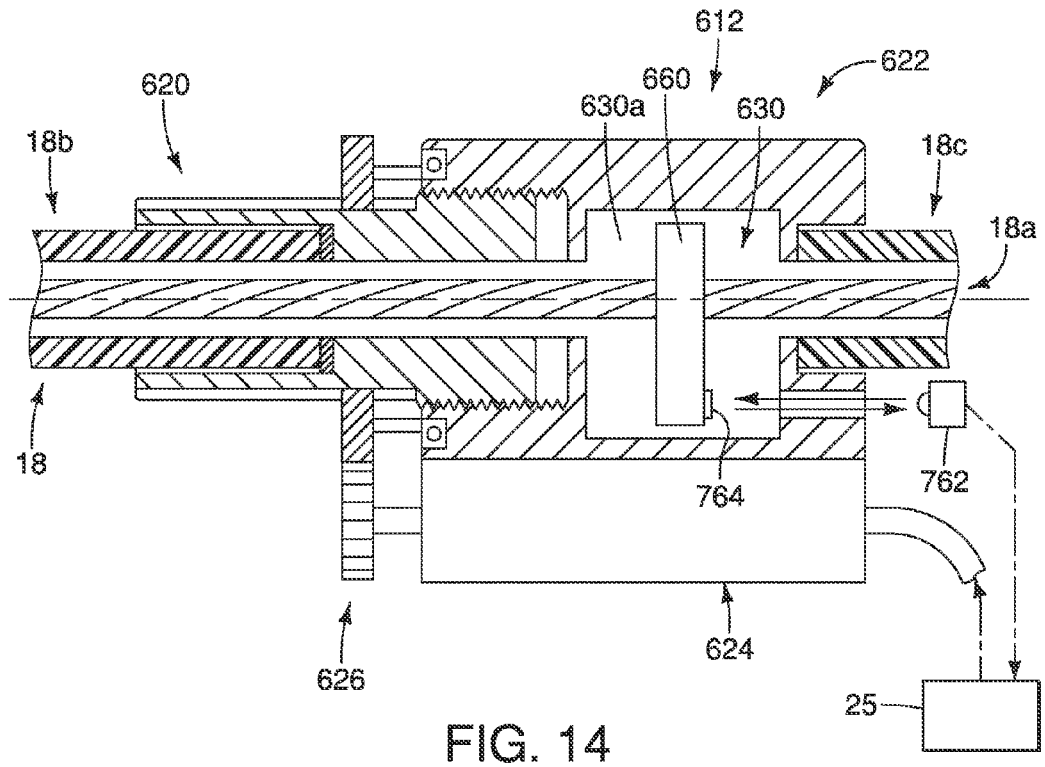
FIG. 14 is a longitudinal cross-sectional view of a modified cable adjusting unit in accordance with the sixth embodiment.

In particular, as illustrated in FIG. 14, the cable adjusting unit 612 can be coupled to a cable stroke sensor 762. The cable stroke sensor 762 has an optical distance sensor, such as an optical range finder. In this case, a reflection part 764, such as a mirror, is attached to the sensor element 660. The cable stroke sensor 762 detects a reflecting light on the reflection part 764 through an opening in the second member 622, thereby detecting the cable stroke of the bicycle control cable 18. Of course, it will be apparent to those skilled in the art from this disclosure that the second member 622 can be modified for installing the cable stroke sensor 762.

Figure 15:
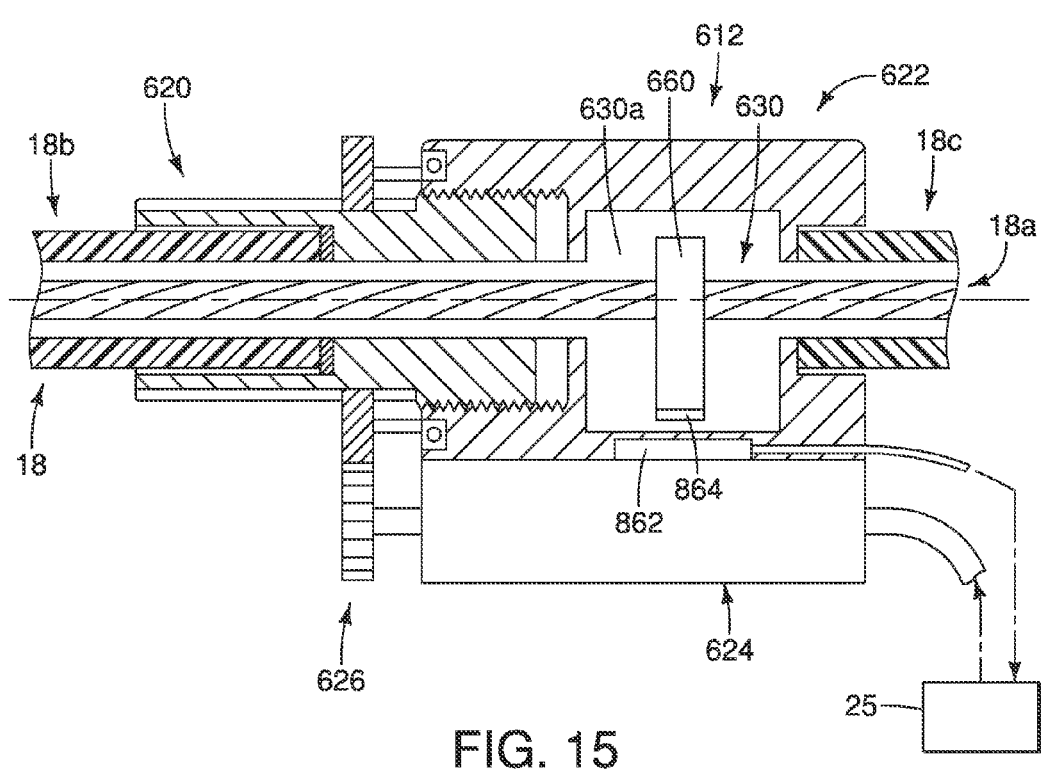
FIG. 15 is a longitudinal cross-sectional view of a modified cable adjusting unit in accordance with the sixth embodiment.

Furthermore, as illustrated in FIG. 15, the cable adjusting unit 612 can be coupled to a cable stroke sensor 862. The cable stroke sensor 862 has a magnetism sensor, such as a hole sensor. In this case, a magnet 864 is attached to the sensor element 660. The cable stroke sensor 862 is arranged to detect the position of the magnet in the second member 622, thereby detecting the cable stroke of the bicycle control cable 18. Of course, it will be apparent to those skilled in the art from this disclosure that the second member 622 can be modified for installing the cable stroke sensor 862.

In any above embodiments, the cable adjusting units 12, 112, 212, 312, 412, 512, 612 may be covered by a cover member or housing (not shown) which has through hole to pass the bicycle control cables 15, 16, 17 and 18. The cover member or housing is coupled to the actuator and/or the second member so as to prevent dust and liquid from outside.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise specified.

In understanding the scope of the present invention, the term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "attached", "mounted", "bonded", "fixed" and their derivatives.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cable adjusting unit comprising:
   a first member including a first abutment and a first through hole, the first abutment being configured to face a first outer case of a bicycle cable, the first through hole having an internal diameter that is equal to or larger than an external diameter of an inner cable of the bicycle cable and smaller than an external diameter of the first outer case;
   a second member movably arranged with respect to the first member, the second member including a second abutment and a second through hole, the second abutment facing away from the first abutment, the second through hole having an internal diameter that is equal to or larger than an external diameter of the inner cable of the bicycle cable, the second through hole being coaxial with respect to the first through hole about a common longitudinal center axis, the second member having an internally threaded section that engages with an externally threaded section of the first member such that the first member and the second member are rotatably coupled together with a thread coupling; and
   an actuator operatively coupled to at least one of the first member and the second member, the actuator being arranged to relatively move the first member with respect to the second member by turning an output gear that is arranged coaxially with respect to the first member, the actuator being offset from the longitudinal center axis of the first and second through holes,
   the first member and the second member being configured to be disposed between adjacent ends of the first outer case and a second outer case of the bicycle cable such that the adjacent ends of the first and second outer cases of the bicycle cable contact with the first and second abutments of the first and second members, respectively.

2. The cable adjusting unit according to claim 1, wherein the actuator includes a motor.

3. The cable adjusting unit according to claim 1, wherein the actuator includes a solenoid.

4. The cable adjusting unit according to claim 1, further comprising
   a controller operatively coupled to the actuator, the controller being configured to operate the actuator upon receiving an input signal.

5. The cable adjusting unit according to claim 4, wherein the controller is configured to receive the input signal from a manually operated device that is electrically coupled to the controller.

6. The cable adjusting unit according to claim 4, wherein the controller is configured to receive the input signal from a brake sensor that is electrically coupled to the controller and configured to detect a state of a bicycle brake.

7. The cable adjusting unit according to claim 4, wherein the controller is configured to receive the input signal from a cable stroke sensor that is electrically coupled to the controller and configured to detect a cable stroke of a bicycle cable.

8. The cable adjusting unit according to claim 1, wherein the second member is a part of one of a brake operating device, a shift operating device, a derailleur and a transmission device.

9. The cable adjusting unit according to claim 1, wherein the actuator is operatively coupled to both of the first member and the second member.

10. The cable adjusting unit according to claim wherein the output gear engages with the first member such that the output gear rotates together with the first member while allowing the first member to move slidably with respect to the output gear in an axial direction of the cable adjusting unit.

11. The cable adjusting unit according to claim 1, wherein the output gear is fixed to the first member.

12. A cable adjusting unit comprising:
   a first member;
   a second member movably arranged with respect to the first member;
   an actuator operatively coupled to at least one of the first member and the second member, the actuator being arranged to relatively move the first member with respect to the second member; and a controller operatively coupled to the actuator, the controller being configured to operate the actuator upon receiving an input signal from a noise sensor, the noise sensor being electrically coupled to the controller and configured to detect a noise of a bicycle component, the noise sensor including an accelerometer.

13. The cable adjusting unit according to claim 12, wherein
the noise sensor is configured to be attached to the bicycle component.

14. The cable adjusting unit according to claim 13, wherein
the controller is configured to detect a misalignment of the bicycle component with respect to a predetermined position based on the input signal from the noise sensor.

15. The cable adjusting unit according to claim 14, wherein
the controller is configured to operate the actuator such that the misalignment is reduced.

16. The cable adjusting unit according to claim 13, wherein
the bicycle component is a front derailleur or a rear derailleur.

17. A cable adjusting unit comprising:
a first member including a first abutment and a first through hole, the first abutment being configured to face a first outer case of a bicycle cable, the first through hole having an internal diameter that is equal to or larger than an external diameter of an inner cable of the bicycle cable and smaller than an external diameter of the first outer case, the first member having a portion with serrations arranged to extend longitudinally on an outer peripheral surface of the first member;
a second member movably arranged with respect to the first member, the second member including a second through hole having an internal diameter that is equal to or larger than an external diameter of the inner cable of the bicycle cable, the second through hole being coaxial with respect to the first through hole about a common longitudinal center axis, the second member having an internally threaded section that engages with an externally threaded section of the first member such that the first member and the second member are rotatably coupled together with a thread coupling; and
an actuator operatively coupled to at least one of the first member and the second member, the actuator being arranged to relatively move the first member with respect to the second member by turning an output gear that is arranged axially slidably and non-rotatably with respect to the first member, the actuator being offset from the longitudinal center axis of the first and second through holes,
the output gear having grooves provided on an annular inner surface of the output gear, the output gear being arranged and configured such that the grooves mesh with the serrations of the first member.

18. A cable adjusting unit comprising:
a first member including a first abutment and a first through hole, the first abutment being configured to face a first outer case of a bicycle cable, the first through hole having an internal diameter that is equal to or larger than an external diameter of an inner cable of the bicycle cable and smaller than an external diameter of the first outer case;
a second member movably arranged with respect to the first member, the second member including a second through hole having an internal diameter that is equal to or larger than an external diameter of the inner cable of the bicycle cable, the second through hole being coaxial with respect to the first through hole about a common longitudinal center axis, the second member having an internally threaded section that engages with an externally threaded section of the first member such that the first member and the second member are rotatably coupled together with a thread coupling; and
an actuator operatively coupled to at least one of the first member and the second member, the actuator being arranged to relatively move the first member with respect to the second member by turning an output gear that is arranged axially slidably and non-rotatably with respect to the first member, the actuator being offset from the longitudinal center axis of the first and second through holes,
the actuator including a drive shaft and a first gear having first external gear teeth, the first gear being provided on the drive shaft, the first gear being arranged such that the first external gear teeth mesh with external gear teeth of the output gear.

* * * * *